US012073542B2

(12) United States Patent
Yue et al.

(10) Patent No.: US 12,073,542 B2
(45) Date of Patent: Aug. 27, 2024

(54) IMAGE PROCESSING METHOD, IMAGE PROCESSING APPARATUS, AND NON-TRANSITORY STORAGE MEDIUM

(71) Applicant: NEW ORIENTAL EDUCATION & TECHNOLOGY GROUP INC., Beijing (CN)

(72) Inventors: Haichun Yue, Beijing (CN); Jun Zhang, Beijing (CN); Yongliang Lan, Beijing (CN); Bochuan Wu, Beijing (CN); Li Li, Beijing (CN)

(73) Assignee: NEW ORIENTAL EDUCATION & TECHNOLOGY GROUP INC., Beijing (CN)

(*) Notice: Subject to any disclaimer, the term of this patent is extended or adjusted under 35 U.S.C. 154(b) by 0 days.

(21) Appl. No.: 18/271,278

(22) PCT Filed: Dec. 3, 2021

(86) PCT No.: PCT/CN2021/135356
§ 371 (c)(1),
(2) Date: Nov. 20, 2023

(87) PCT Pub. No.: WO2022/148192
PCT Pub. Date: Jul. 14, 2022

(65) Prior Publication Data
US 2024/0078646 A1    Mar. 7, 2024

(30) Foreign Application Priority Data
Jan. 7, 2021    (CN) .......................... 202110015478.1

(51) Int. Cl.
*G06T 5/80*    (2024.01)
*G06T 5/20*    (2006.01)
(Continued)

(52) U.S. Cl.
CPC ................. *G06T 5/80* (2024.01); *G06T 5/20* (2013.01); *G06T 7/12* (2017.01); *G06T 7/136* (2017.01);
(Continued)

(58) Field of Classification Search
None
See application file for complete search history.

(56) References Cited

U.S. PATENT DOCUMENTS 10,572,758 B1 *  2/2020  Wilbert .................... G06T 11/60
11,308,710 B2 *  4/2022  Zhu ....................... G06V 10/457
(Continued)

FOREIGN PATENT DOCUMENTS

CN    106203433 A    12/2016
CN    109409366 A    3/2019
(Continued)

OTHER PUBLICATIONS

The First Office Action with Search report issued by the China National Intellectual Property Administration for Chinese Patent Application No. 202110015478.1, dated Feb. 23, 2021, with English translation.
(Continued)

*Primary Examiner* — Randolph I Chu
(74) *Attorney, Agent, or Firm* — MYERS WOLIN, LLC

(57) ABSTRACT

An image processing method includes: acquiring an input image of a teaching scenario; performing detection on the input image to determine a rectangular detection area that includes a blackboard-writing area; analyzing the rectangular detection area to determine a target area corresponding to the blackboard-writing area; determining four vertices of the target area; and according to the four vertices of the target area, performing coordinate transformation on the target area to obtain a corrected blackboard-writing area image.

20 Claims, 10 Drawing Sheets

(51) Int. Cl.
*G06T 7/12* (2017.01)
*G06T 7/136* (2017.01)
*G06T 7/64* (2017.01)
*G06V 10/762* (2022.01)
*G06V 20/40* (2022.01)
*G06V 20/50* (2022.01)

(52) U.S. Cl.
CPC .............. *G06T 7/64* (2017.01); *G06V 10/762* (2022.01); *G06V 20/41* (2022.01); *G06V 20/46* (2022.01); *G06V 20/50* (2022.01); *G06T 2207/10016* (2013.01)

(56) References Cited

U.S. PATENT DOCUMENTS

| | | | | |
|---|---|---|---|---|
| 2002/0005856 | A1* | 1/2002 | Sasaki | G06T 17/20 345/606 |
| 2004/0165786 | A1* | 8/2004 | Zhang | G06V 30/146 382/276 |
| 2009/0027629 | A1* | 1/2009 | Yonezawa | H04N 5/7416 353/121 |
| 2012/0033876 | A1* | 2/2012 | Momeyer | G06V 20/46 382/165 |
| 2013/0051671 | A1* | 2/2013 | Barton | G06T 7/181 382/173 |
| 2017/0142285 | A1 | 5/2017 | Miyagi | |
| 2017/0249340 | A1 | 8/2017 | Okuda et al. | |
| 2019/0370943 | A1* | 12/2019 | Wang | G06T 3/00 |
| 2020/0327640 | A1* | 10/2020 | Lemay | G06T 7/194 |
| 2020/0364463 | A1* | 11/2020 | Pooja | G06V 20/47 |
| 2021/0216766 | A1* | 7/2021 | Luo | G06V 30/416 |
| 2021/0247852 | A1* | 8/2021 | Sinden | A63F 13/219 |
| 2021/0383126 | A1* | 12/2021 | Ju | H04N 21/251 |

FOREIGN PATENT DOCUMENTS

| | | |
|---|---|---|
| CN | 111681284 A | 9/2020 |
| CN | 111861943 A | 10/2020 |
| CN | 112348815 A | 2/2021 |
| JP | 2006-221525 A | 8/2006 |

OTHER PUBLICATIONS

The Supplementary Search report issued by the China National Intellectual Property Administration for Chinese Patent Application No. 202110015478.1, dated Mar. 4, 2021, with English translation.
Notification to Grant Patent Rights issued by the China National Intellectual Property Administration for Chinese Patent Application No. 202110015478.1, dated Mar. 15, 2021, with English translation.
International Search report issued by the China National Intellectual Property Administration for International Patent Application No. PCT/CN2021/135356, mailed on Mar. 1, 2022, with English translation.
Notice of Reasons for Refusal issued by the Japan Patent Office for Japanese Patent Application No. 2023-541634, mailed on Nov. 28, 2023, with an English translation.

\* cited by examiner

IMAGE PROCESSING METHOD, IMAGE PROCESSING APPARATUS, AND NON-TRANSITORY STORAGE MEDIUM

CROSS REFERENCE TO RELATED APPLICATIONS

The present application is a U.S. National Stage of International Application No. PCT/CN2021/135356, filed on Dec. 3, 2021, which claims the benefit of priority to Chinese patent application No. 202110015478.1, filed on Jan. 7, 2021, both of which are incorporated herein by reference in their entireties for all purposes.

TECHNICAL FIELD

Embodiments of the disclosure relate to an image processing method, an image processing apparatus and a non-transitory storage medium.

BACKGROUND

With the continuous development of educational informatization, an application of video courses in the teaching process is becoming increasingly widespread. For example, when conducting face-to-face classroom teaching, classroom teaching videos are formed by recording classroom teaching content through a recording system, so that students may watch the classroom teaching videos online to learn and review relevant teaching content. In addition, the classroom teaching videos are widely used in teaching evaluation, demonstration class recording, teaching observation, remote teaching and the like.

SUMMARY

At least some embodiments of the present disclosure provide an image processing method, including: acquiring an input image of a teaching scenario; performing detection on the input image to determine a rectangular detection area that includes a blackboard-writing area; analyzing the rectangular detection area to determine a target area corresponding to the blackboard-writing area; determining four vertices of the target area; and according to the four vertices of the target area, performing coordinate transformation on the target area to obtain a corrected blackboard-writing area image.

At least some embodiments of the present disclosure further provide an image processing apparatus, including: a memory for non-transitory storage of computer-readable instructions; and a processor for executing the computer-readable instructions, where the processor, when executing the computer-readable instructions, performs the image processing method in any embodiment of the present disclosure.

At least some embodiments of the present disclosure further provide a non-transitory storage medium that non-transitorily stores computer-readable instructions, where a computer, when executing the computer-readable instructions, performs the image processing method in any embodiment of the present disclosure.

BRIEF DESCRIPTION OF THE DRAWINGS

In order to describe technical solutions in the embodiments of the present disclosure more clearly, the following briefly introduces accompanying drawings for describing the embodiments. Apparently, the accompanying drawings in the following description only relate to some embodiments of the disclosure, rather than limit it.

DETAILED DESCRIPTION

Figure 1:
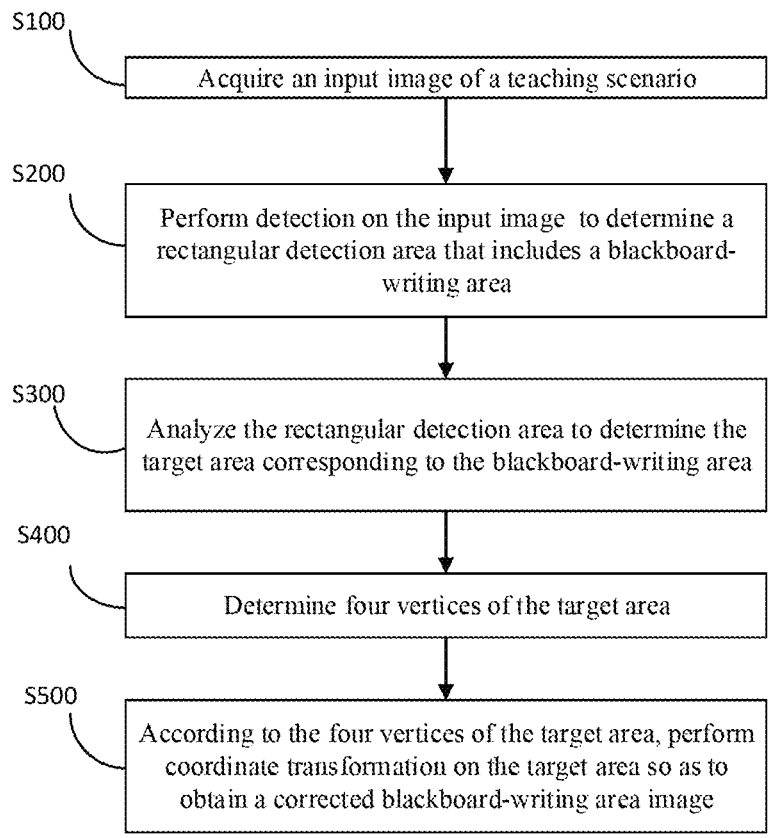
FIG. 1 is a flowchart of an image processing method according to at least some embodiments of the present disclosure.

In order to make objectives, technical solutions and advantages of embodiments of the present disclosure clearer, the technical solutions in the embodiments of the present disclosure will be clearly and completely described below with reference to accompanying drawings in the embodiments of the present disclosure. Apparently, the described embodiments are only a part rather than all of the embodiments of the present disclosure. All other embodiments obtained by those of ordinary skill in the art based on the embodiments of the present disclosure without any creative efforts shall fall within the protection scope of the present disclosure.

Unless otherwise defined, technical terms or scientific terms used in the disclosure shall have ordinary meanings understood by those of ordinary skills in the field to which this disclosure belongs. The terms "first", "second" and the like used in the disclosure do not indicate any sequence, quantity or importance, and are merely used to distinguish between different components. The terms "including" or "comprising" and the like are intended to indicate that elements or objects in front of a word encompass elements or objects listed after the word and their equivalents, but do not exclude other elements or objects. Similar terms such as "connected" or "linked" are not limited to physical or mechanical connections, but may include electrical connections, whether direct or indirect. The terms "upper", "lower", "left", "right" and the like are only used to represent a relative positional relationship, and when an absolute position of a described object changes, the relative positional relationship may also change accordingly.

The present disclosure is described below in combination with specific examples. In order to maintain clarity and conciseness of the following description of the embodiments of the present disclosure, detailed description of known functions and components has been omitted from the disclosure. When any component in the embodiments of the present disclosure appears in more than one accompanying drawing, the component is represented by the same or similar reference number in each accompanying drawing.

Currently, when recording classroom teaching videos, cameras are usually used to capture videos in the direction of a podium of a teaching classroom. In actual classroom teaching scenes, installation of cameras is very complex, and installation positions of the cameras inevitably result in varying degrees of pitch and yaw angles. Sometimes, due to improper installation, a certain degree of roll angle might be formed, which may lead to significant video image distortion.

In order to solve a problem of video image distortion, currently two main methods are used. The first method (abbreviated as "screen annotation method") is to manually annotate collected video images, obtain a plurality of known two-dimensional point coordinates, then obtain a homography matrix based on a relationship between two-dimensional coordinates and three-dimensional coordinates, and finally correct an image distortion based on the homography matrix. The second method (abbreviated as "on-site calibration method") is to use a plurality of cameras or depth cameras, calibrate the cameras through a calibration board placed on site, and then correct the image distortion based on obtained camera parameters. However, this method requires additional hardware costs (using a plurality of cameras or expensive depth cameras) and is not universally applicable.

However, both methods require significant manual workload. Moreover, the cameras actually installed in classrooms often undergo changes in angle, position and focal length due to various environmental factors (such as vibrations caused by construction). Considering that each change requires another screen annotation or on-site calibration, a manpower cost investment will be even more incalculable.

At least some embodiments of the present disclosure provide an image processing method. The image processing method includes: acquiring an input image of a teaching scenario; performing detection on the input image to determine a rectangular detection area that includes a blackboard-writing area; analyzing the rectangular detection area to determine a target area corresponding to the blackboard-writing area; determining four vertices of the target area; and according to the four vertices of the target area, performing coordinate transformation on the target area to obtain a corrected blackboard-writing area image.

Some embodiments of the present disclosure further provide an image processing apparatus and a non-transitory storage medium corresponding to the image processing method.

According to the image processing method provided in the embodiments of the present disclosure, the corrected blackboard-writing area image may be obtained by calibrating and correcting the distorted blackboard-writing area in the input image. The image processing method only requires use of low-cost fixed cameras and does not require installation of additional equipment. It has high practicality and is suitable for large-scale popularization and promotion. At the same time, there is no need for manual data annotation of input images, nor is there a need to place a calibration board and perform camera calibration in a teaching scenario, which may greatly save labor costs. Furthermore, based on automatic annotation and correction results of the blackboard-writing area, specific processing of a corresponding area may be assisted, for example, students may be assisted in focusing their viewing interests on the blackboard-writing area.

The embodiments and examples of the present disclosure are described in detail below in conjunction with the drawings. It should be understood that specific embodiments described here are only used to illustrate and explain the present disclosure, but not to limit the present disclosure.

FIG. 1 is a flowchart of an image processing method according to at least some embodiments of the present disclosure. For example, the image processing method may be applied to a computing device, which includes any electronic device with computing functions, such as a smartphone, a laptop, a tablet computer, a desktop computer, a server, and the like. The embodiments of the present disclosure have no limitations to this. For example, the computing device is provided with a CPU (Central Processing Unit) or a GPU (Graphics Processing Unit), and the computing device further includes a memory. The memory is, for example, a non-volatile memory such as an ROM (Read Only Memory), which stores operating system codes. For example, codes or instructions are also stored on the memory, and by executing these codes or instructions, the image processing method provided in the embodiments of the present disclosure may be implemented.

For example, as shown in FIG. 1, the image processing method includes the following steps S100 to S500.

Step S100: acquiring an input image of a teaching scenario.

For example, in typical teaching scenarios, teachers teach on the podium, assisted by various types of blackboard-writing. For example, in an embodiment of the present disclosure, blackboard-writing refers to a carrier that may be used to display teaching contents of teachers, including a blackboard, a whiteboard, a projection area of a PPT, and the like. For example, in blackboard-writing, teachers may explain the teaching contents through text, graphics, symbols and other blackboard-writing content. It should be understood that for the blackboard-writing on the blackboard, whiteboard, projection area of PPT, and the like, regardless of whether there is specific blackboard-writing content on the above, they are all considered as the blackboard-writing.

For example, the input image of the teaching scenario may include photos and video images taken from a camera (such as a lens of a video camera, a smartphone camera, and the like) in the direction of the podium of the teaching scenario. For example, a picture of the input image of the teaching scenario usually includes a picture of the blackboard-writing (that is, the blackboard-writing area).

For example, in some embodiments, the input image may be a color image. For example, color images include but are not limited to color images with three color channels. For example, the three color channels include first color channel, second color channel and third color channel. For example, these three color channels correspond to the three primary colors respectively. For example, in some embodiments, the first color channel is a red (R) channel, the second color channel is a green (G) channel, and the third color channel is a blue (B) channel, that is, the color image may be in an RGB format. It should be noted that the embodiments of the present disclosure include but are not limited to this. For example, in other embodiments, the input image may alternatively be a grayscale image.

Step S200: performing detection on the input image to determine a rectangular detection area that includes a blackboard-writing area.

For example, in some embodiments, common object detection algorithms may be used to detect the blackboard-writing area in the input image. For example, the common object detection algorithms include R-CNN (Region-based Convolutional Neural Networks), SPP-net (Spatial Pyramid Pooling-net), Fast R-CNN, Faster R-CNN, R-FCN (Region-based Fully Convolutional Networks), YOLO (You Only Look Once), SSD (Single Shot MultiBox Detector), and the like. For example, detection results of the object detection algorithms may include the category and position of a target object contained in the input image, where presence of the blackboard-writing area in the input image may be judged according to the category of the target object, and a position of the blackboard-writing area may be determined based on a position of the target object. For example, a position of the target object is generally determined by returning a bounding box (such as an upper left and lower right corner coordinates of the bounding box) of the target object in the object detection algorithms. It should be understood that an object detection model is usually necessary to be trained before executing step S200 using the object detection algorithms. A training process may refer to common training methods, which will not be repeated here. Certainly, a pre-trained object detection model may alternatively be used.

For example, step S200 is used to detect the presence of the blackboard-writing area in the input image and return the bounding box of the blackboard-writing area. Due to varying complexity of different teaching scenarios (such as classrooms), difficulty of extracting the blackboard-writing area from the input images of different teaching scenarios also varies. If the blackboard-writing area is extracted based on the full scenario of the input image, it will be greatly affected by complex backgrounds, person occlusion or natural scenario changes. Moreover, operating on the input image of the full scenario will increase computational costs and reduce running speed. In order to better detect the blackboard-writing area, computing resources may be concentrated in specific small areas. For example, in some embodiments, a YOLOv5 model may be used to segment specific areas from the full scenario image. The YOLOv5 model outperforms other models in terms of flexibility and has strong advantages in rapid deployment of the model, as well as lightweight and fast characteristics. The YOLOv5 model may output bounding box regression results and classification results. Therefore, a bounding box classified as the blackboard-writing area may be obtained, for example, upper left corner coordinates (X_leftTop, Y_leftTop) and lower right corner coordinates (X_rightBottom, Y_rightBottom) of the bounding box in the blackboard-writing area may be obtained. The YOLOv5 model may reduce a detection range in the input image and eliminate partial background interference for subsequent detection.

For example, in some embodiments, the bounding box of the blackboard-writing area output by the target detection model (such as YOLOv5 model) is a minimum bounding rectangular box of a detected blackboard-writing area, and the rectangular area surrounded by the minimum bounding rectangular box is the rectangular detection area in step S200. For example, in other embodiments, in order to facilitate subsequent processing, the minimum bounding rectangular box may be expanded outwards by several pixels such as 10 to 20 pixels (for example, 15 pixels) in the four directions that is, above, below, left and right respectively, so as to obtain a new rectangular box. An area of the new rectangular box is slightly larger than an area of the minimum bounding rectangular box. In this case, the rectangular area surrounded by the new rectangular box may be taken as the rectangular detection area in step S200.

Figure 2:
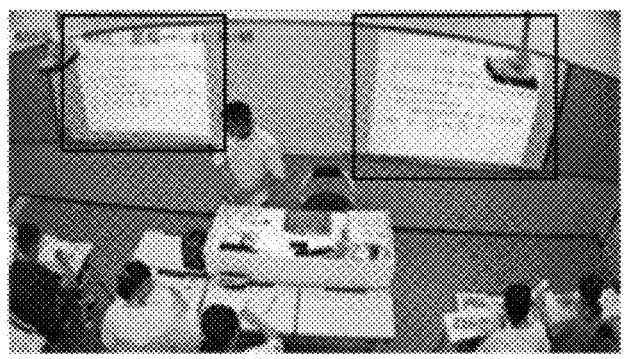
FIG. 2 is a schematic diagram of a rectangular detection area of an input image according to at least some embodiments of the present disclosure.

For example, in some embodiments, in order to eliminate possible false detection, original features of the blackboard-writing area may be used as first prior knowledge to validate the rectangular detection area, so as to eliminate misclassification of the target detection model and improve an accuracy of the target detection model. FIG. 2 is a schematic diagram of a rectangular detection area of an input image according to at least some embodiments of the present disclosure. As an example, the input image in FIG. 2 shows two distorted blackboard-writing areas (PPT areas that deviate from a rectangle due to distortion) and two corresponding rectangular detection areas (as shown in the black rectangular box in FIG. 2). It should be understood that FIG. 2 is illustrative and shouldn't be considered as a limitation on the embodiments of the present disclosure.

For example, in some embodiments, the first prior knowledge includes: central coordinates of the blackboard-writing area are usually located in the upper half of the input image. Correspondingly, central coordinates of the rectangular detection area are usually also located in the upper half of the input image. For example, the central coordinates of the rectangular detection area may be calculated based on the upper left corner coordinates and lower right corner coordinates of the bounding box of the blackboard-writing area. For example, the central coordinates of the rectangular detection area are ((X_leftTop+X_rightBottom)/2, (Y_leftTop+Y_rightBottom)/2).

For example, in some embodiments, the first prior knowledge further includes: an aspect ratio of the blackboard-writing area being within a first range. In the real world, the aspect ratio of the blackboard-writing area is usually known, for example, the aspect ratio of a PPT area is usually 4:3 or 16:9, an aspect ratio of a whiteboard area is usually 1.5:1, and an aspect ratio of a blackboard area is usually between 3:1 and 4:1. Considering that distortion of the blackboard-writing area in the input image is usually not severe, an aspect ratio of the rectangular detection area mentioned above is supposed to be close to the aspect ratio of the blackboard-writing area. For example, in some embodiments, requirements for the aspect ratio of the rectangular detection area may be set as follows:

$$0 \leq \frac{|R - R0|}{R0} \leq x,$$

where R represents an aspect ratio of the rectangular detection area, R0 represents the aspect ratio of the blackboard-writing area, and x represents the percentage of acceptable differences. Thus, a first range may be set as [(1−x)*R0, (1+x)*R0)]. For example, a value of x may be set according to actual needs, which is not restricted in the embodiments of the present disclosure. For example, in some embodiments, the value range of x may be set as [5%, 15%], for example, x may be set as 10%, but not limited to this.

For a theoretically undistorted blackboard-writing area, a specific position of the blackboard-writing area may be directly determined through the detection processing in step S200. However, in practical applications, due to varying degrees of distortion in the camera of the teaching scenario, the blackboard-writing area in the input image undergoes varying degrees of distortion (there are basically no exactly rectangular blackboard-writing areas in the input image), leading to a certain impact on calibration of the blackboard-writing area, and making it difficult to directly determine the specific position of the blackboard-writing area through step S200. Therefore, it is necessary to perform subsequent processing on the rectangular detection area obtained in step S200.

Step S300: analyzing the rectangular detection area to determine the target area corresponding to the blackboard-writing area.

For example, by step S300, the vast majority or all of the pixels that do not belong to the blackboard-writing area in the rectangular detection area may be excluded, and the specific position of the blackboard-writing area is determined (that is, the target area).

Figure 3:
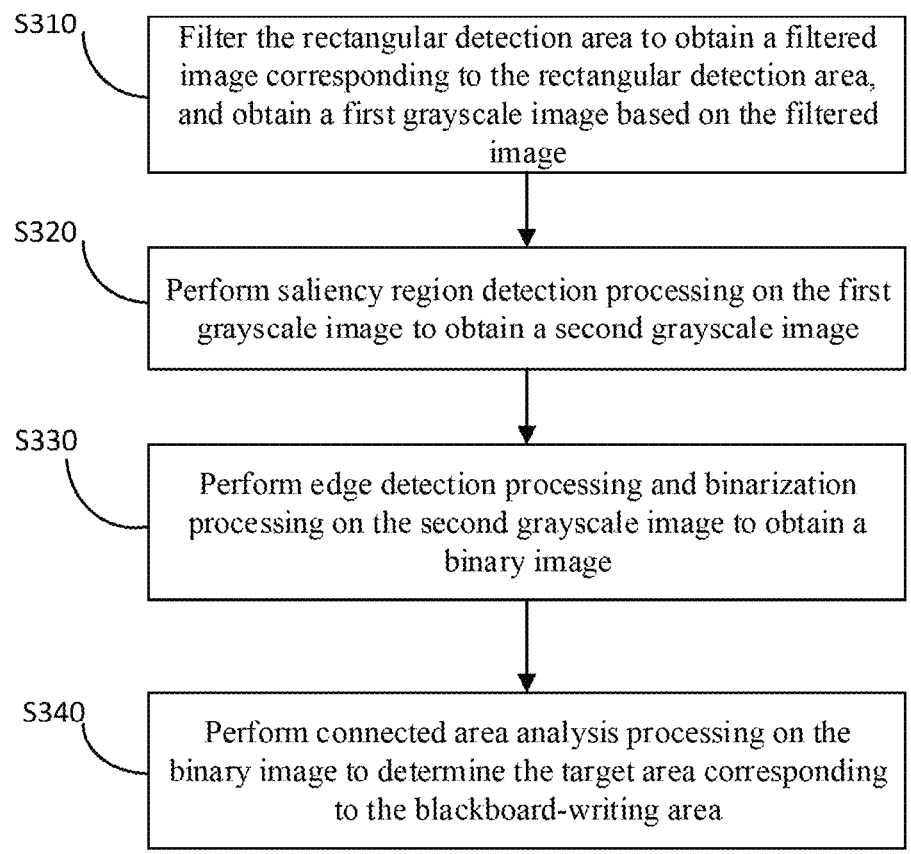
FIG. 3 is an example flowchart corresponding to step S300 shown in FIG. 1 according to at least some embodiments of the present disclosure.

FIG. 3 is an example flowchart corresponding to step S300 shown in FIG. 1 according to at least some embodiments of the present disclosure. For example, as shown in FIG. 3, the step S300 may include the following steps S310 to S40.

Step S310: filtering the rectangular detection area to obtain a filtered image corresponding to the rectangular detection area, and obtaining a first grayscale image based on the filtered image.

For example, in some embodiments, a median filtering algorithm is used to filter the rectangular detection area (the rectangular detection area in the input image is taken as one image). For example, the median filtering algorithm is a nonlinear smoothing technique, a principle of the median filtering algorithm is to replace the grayscale value of each pixel with a median of grayscale values of all pixels in the neighborhood window of the pixel (such as an eight-neighborhood window composed of eight pixels other than the pixel in a 3×3 window with the pixel as the center), making the surrounding pixel values closer to the true values, suppressing useless noise points and eliminating redundant interference. It should be noted that the embodiments of the present disclosure do not limit the methods used for filtering processing. In addition, it should be noted that in the image, a location of noise points is usually in areas with significant grayscale changes, and the location of the noise points is easily recognized as pseudo edges. Therefore, the filtering processing in step S310 may improve effectiveness of edge detection processing in the subsequent step S330.

For example, in some embodiments, the input image is a color image (such as a color image in an RGB format), and correspondingly, the filtered image is also a color image; in this case, the color image (such as the filtered image) may be converted into a grayscale image (such as a first grayscale image) with common conversion formulas. Taking the conversion of the color image in the RGB format into the grayscale image as an example, the following conversion formula may be used for conversion:

$$\text{Gray} = R*0.299 + G*0.587 + B*0.114,$$

where Gray represents the brightness information of the grayscale image, R, G and B represent red information (that is, data information of a red channel), green information (that is, data information of a green channel) and blue information (that is, data information of a blue channel) of the color image in the RGB format respectively.

For example, in other embodiments, the input image is a grayscale image, and correspondingly, the filtered image is also a grayscale image. In this case, the filtered image may be directly used as a first grayscale image.

Step 320: performing saliency region detection processing on the first grayscale image to obtain a second grayscale image.

Figure 4:
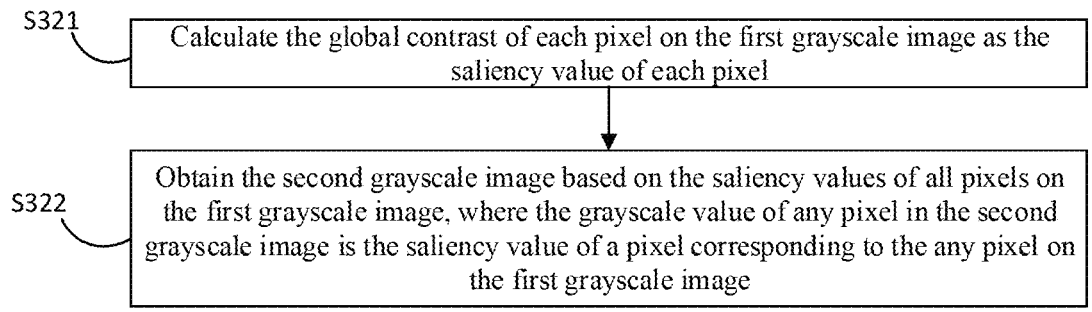
FIG. 4 is an example flowchart corresponding to step S320 shown in FIG. 3 according to at least some embodiments of the present disclosure.

For example, in some embodiments, a saliency detection method based on global contrast may be used for saliency region detection of the first grayscale image. For example, in some embodiments, as shown in FIG. 4, the step S320 may include the following steps S321 and S322.

Step S321: calculating the global contrast of each pixel of the first grayscale image on the first grayscale image as the saliency value of each pixel.

For example, a saliency detection method based on global contrast may be used for calculating the global contrast of each pixel on the entire image (that is, the first grayscale image) as the saliency value of each pixel, that is, a sum of distances between each pixel and other pixels in the image on the grayscale value is taken as the saliency value of each pixel. For example, the saliency value of any pixel in an image may be calculated with the following formula:

$$\text{SalS}(I_k) = \Sigma_{\forall I_i \in I} \|I_k I_i\|,$$

where SalS ($I_k$) represents a saliency value of the k-th pixel in image I, $I_k$ represents a grayscale value of the k-th pixel in image I, and $I_i$ represents a grayscale value of the i-th pixel in the image I. This method may highlight the most salient object in the rectangular detection area (such as the PPT area with higher brightness shown in FIG. 2), and has higher noise resistance.

Step S322: obtaining the second grayscale image based on the saliency values of all pixels on the first grayscale image, where a grayscale value of any pixel of the second grayscale image is a saliency value of a pixel corresponding to any pixel of the first grayscale image.

For example, in some embodiments, a grayscale value of each pixel in the first grayscale image may be replaced with a saliency value of each pixel in the first grayscale image, thereby obtaining the second grayscale image.

Step S330: performing edge detection processing and binarization processing on the second grayscale image to obtain a binary image.

Figure 5:
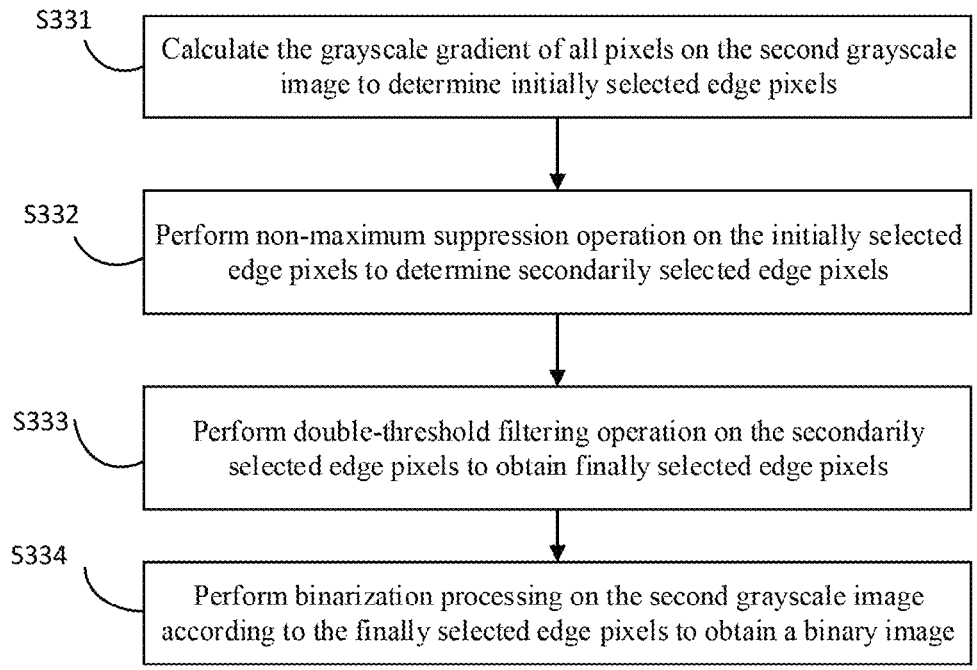
FIG. 5 is an example flowchart corresponding to step S330 shown in FIG. 3 according to at least some embodiments of the present disclosure.

For example, in some embodiments, any of the edge detection algorithms such as Sobel algorithm, Canny algorithm and Laplacian algorithm may be used to perform edge detection processing on the second grayscale image. For example, in some embodiments, as shown in FIG. 5, the step S330 may include the following steps S331 to S334.

Step S331: calculating a grayscale gradient of all pixels of the second grayscale image to determine initially selected edge pixels.

For example, object edge in an image may be determined by calculating grayscale gradient, as the grayscale gradient may reflect areas where grayscale changes are significant, and the object edge is also the area where the grayscale changes are significant. Of course, possible object edge (i.e. the initially selected edge pixels) may only be obtained in step S331, because the areas with significant grayscale changes may or may not be the object edge. Based on step S331, a set of the initially selected edge pixels is obtained.

Step S332: performing non-maximum suppression operation on the initially selected edge pixels to determine secondarily selected edge pixels.

For example, areas with significant grayscale changes are usually more concentrated. The pixels with the highest grayscale change (that is, the maximum gradient value) in the gradient direction within a local range are retained, while others are not retained. Accordingly, a large portion of the initially selected edge pixels may be eliminated, object edge with multiple-pixel width is transformed into object edge with single-pixel width. By using the non-maximum suppression operation, edges under false detection may be eliminated.

Step S333: performing double-threshold filtering operation on the secondarily selected edge pixels to obtain finally selected edge pixels.

For example, after non-maximum suppression operation, there might still be many secondarily selected edge pixels that do not belong to a real object edge. double thresholds, namely a high threshold and a low threshold, may be further set to facilitate double-threshold filtering operation. If a grayscale gradient value of a certain pixel is higher than the high threshold, the pixel is retained and set as a strong edge pixel. If the grayscale gradient value of a certain pixel is lower than the low threshold, the pixel is discarded. if the grayscale gradient value of a certain pixel is between the high threshold and low threshold, the pixel is set as a weak edge pixel, the grayscale gradient value is searched from the neighborhood window (such as eight neighborhoods) of the pixel. If the grayscale gradient value is higher than the high threshold, the pixel is retained; otherwise, the pixel is discarded. A purpose is that some edges might not be closed if only strong edge pixels are retained, so it is necessary to supplement from weak edge pixels to make the edges as closed as possible.

Due to a significant impact of a selection of double thresholds on results of edge detection processing, an embodiment of the present disclosure provides a method capable of automatically determining a high threshold and a low thresholds based on different images. A median v of the gradient of an image (such as a second grayscale image) is determined, a fixed parameter a0 (a0>0 and a0<1) is set, and the low threshold (1−a0)*v and high threshold (1+a0)*v is calculated. Thus, more reasonable edge detection processing may be carried out on different images in different scenarios, and the object contour (such as the contour of the blackboard-writing area) may be presented more clearly. For example, a value of a0 may be set according to actual needs, which is not restricted in embodiments of the present disclosure. For example, in some embodiments, a value range of a0 may be set as [0.28,0.37], for example, a0 may be set as 0.33, but not limited to this.

Step S334: performing binarization processing on the second grayscale image according to the finally selected edge pixels to obtain a binary image.

For example, in some embodiments, binarization processing may be performed on the second grayscale image by taking an average grayscale value of all finally selected edge pixels in the second grayscale image as a threshold to obtain the binary image. It should be noted that the present disclosure includes but is not limited to this. For example, in practical applications, any other feasible methods may be used to determine the threshold in binarization processing.

Step S340: performing connected area analysis processing on the binary image to determine the target area corresponding to the blackboard-writing area.

Figure 6:
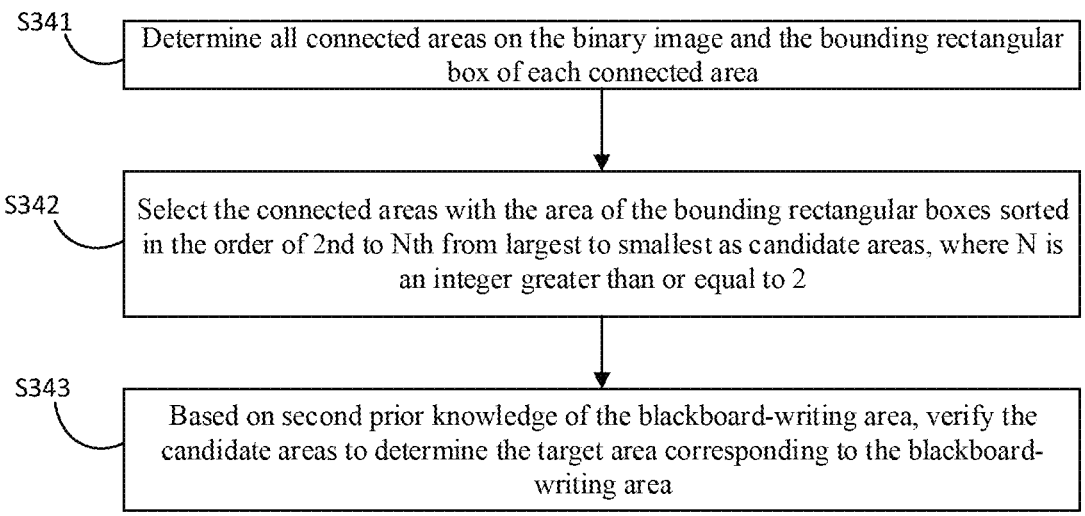
FIG. 6 is an example flowchart corresponding to step S340 shown in FIG. 3 according to at least some embodiments of the present disclosure.

For example, in some embodiments, as shown in FIG. 6, the step S340 may include the following steps S341 to S343.

Step S341: determining all connected areas on the binary image and a bounding rectangular box of each connected area.

For example, a connected area generally refers to an image area composed of foreground pixels with the same pixel value and adjacent positions in the image. For example, common algorithms such as Two-Pass or Seed-Filling or the connectedComponentsWithStates function of OpenCV may be used to find the connected areas in the binary image. Then, a minimum bounding rectangle algorithm (for example, including but not limited to a minAreaRect function of OpenCV) may be used to determine the bounding rectangular box of each connected area. For example, in some embodiments, the upper left corner coordinates (x1, y1) and lower right corner coordinates (x2, y2) of the bounding rectangular box of each connected area may be obtained.

Step S342: selecting the connected areas with the area of the bounding rectangular boxes sorted in the order of 2nd to Nth from largest to smallest as candidate areas, where N is an integer greater than or equal to 2.

For example, in some embodiments, the area of the bounding rectangular box of each connected area may be calculated based on the upper left corner coordinates (x1, y1) and the lower right corner coordinates (x2, y2) of the bounding rectangular box of each connected area. For example, the calculation formula may be expressed as:

$$Area=|x1-x2|*|y1-y2|,$$

where Area represents the area of the bounding rectangular box.

For example, in the binary image, background pixels are generally connected, and the area of the bounding rectangular box corresponding to the background area (that is, the connected area formed by the background pixels) is often the largest. Therefore, in step S342, the connected area with the largest area of the bounding rectangular box may be directly excluded, that is, the background area may be directly excluded.

For example, N may be set according to actual needs, which is not restricted in the embodiments of the present disclosure. For example, in some embodiments, a value range of N may be set as [2,5], such as N=2 or N=5, and on the like.

Step S343: verifying the candidate areas to determine the target area corresponding to the blackboard-writing area based on second prior knowledge of the blackboard-writing area.

For example, in some embodiments, the second prior knowledge includes: a distance between central coordinates of the blackboard-writing area and central coordinates of the binary image being less than a distance threshold. Correspondingly, the distance between the central coordinates of the bounding rectangular box of the blackboard-writing area and the central coordinates of the binary image is also less than a distance threshold. For example, the central coordinates of the bounding rectangular box of each connected area may be calculated based on the upper left corner coordinates and the lower right corner coordinates of the bounding rectangular box of each connected area, and for example, the central coordinates of the bounding rectangular box of each connected area are ((x1+x2)/2, (y1+y2)/2) Then, the distance between the central coordinates of the bounding rectangular box of each connected area and the central coordinates of the binary image may be calculated, where the connected area whose distance is less than the distance threshold is likely to be the target area corresponding to the blackboard-writing area. For example, in some embodiments, the distance between the central coordinates of the bounding rectangular box of each connected area and the central coordinates of the binary image includes a first distance in the width direction of the binary image and a second distance in the height direction of the binary image. Correspondingly, the distance threshold includes a first distance threshold in the width direction of the binary image and a second distance threshold in the height direction of the binary image, where the first distance is supposed to be less than the first distance threshold, and the second distance is supposed to be less than the second distance threshold. For example, the first distance threshold may be set as 5% to 30% or other appropriate proportions of the width of the binary image, and similarly, the second distance threshold may be set as 5% to 30% or other appropriate proportions of the height of the binary image.

For example, in some embodiments, the second prior knowledge further includes: an aspect ratio of the blackboard-writing area being within a second range. For example, the second range may be set as $[(1-y)*R0, (1+y)*R0]$, where R0 represents an aspect ratio of the blackboard-writing area and y represents a percentage of acceptable differences. For example, a value of y may be set according to actual needs, which is not restricted to in the embodiments of the present disclosure. For example, in some embodiments, a value range of y may be set as [5%, 15%], for example, y may be set as 10%, but not limited to this. For example, the first range and the second range may be the same, and of course, the two ranges may also be different.

Figure 7:
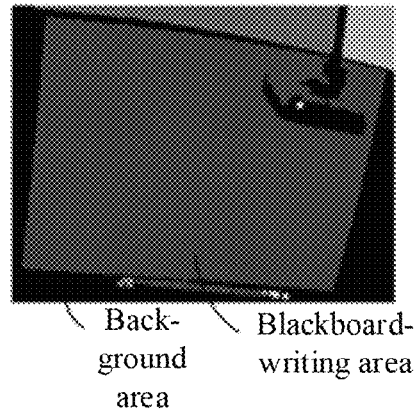
FIG. 7 is a schematic diagram of results of an analysis processing on connected area according to at least some embodiments of the present disclosure.

FIG. 7 is a schematic diagram of results of analysis processing on the connected area according to at least some embodiments of the present disclosure. As an example, as shown in FIG. 7, when connected area analysis processing is performed on the binary image, a plurality of connected areas may be obtained (including the background area, the blackboard-writing area and other unidentified connected areas, as shown in the areas with different grayscales in FIG. 7), where an area size of the bounding rectangular box of the background area is usually ranked first, and an area size of the bounding rectangular box of the blackboard-writing area is usually ranked second in bounding rectangular boxes of all connected areas. It should be noted that in order to display concisely, the bounding rectangular box of each connected area is omitted in FIG. 7. At the same time, in order to distinguish different connected areas, different grayscales are used to represent the different connected areas.

Therefore, FIG. 7 is different from the original binary image. It should be understood that FIG. 7 is illustrative and is not supposed to be considered as a limitation on the embodiments of the present disclosure.

Step S400: determining four vertices of the target area.

Figure 8:
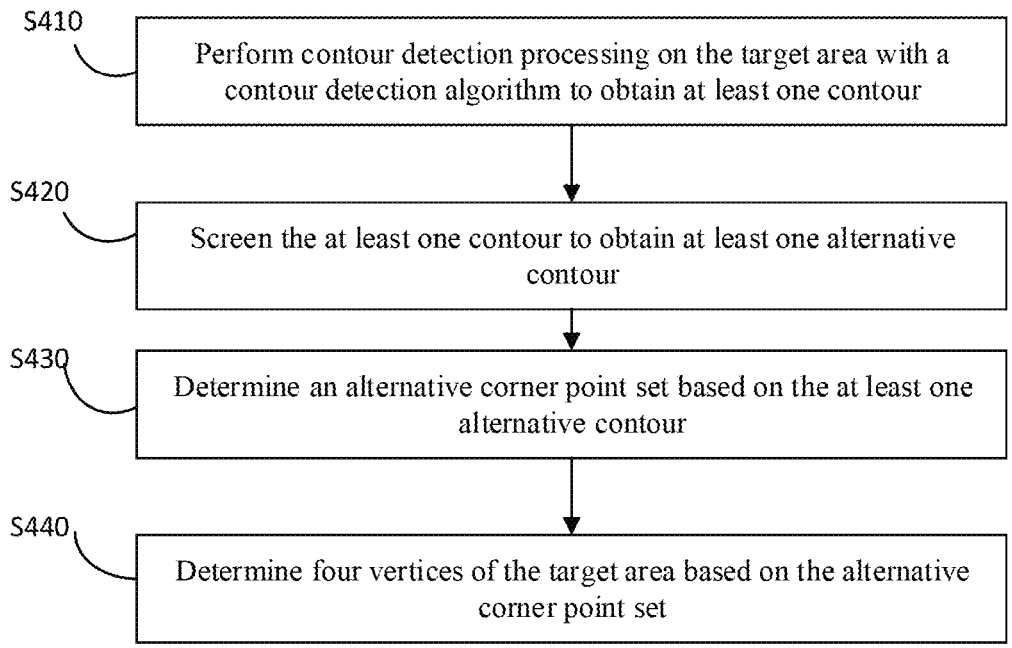
FIG. 8 is an example flowchart corresponding to step S400 shown in FIG. 1 according to at least some embodiments of the present disclosure.

For example, in some embodiments, as shown in FIG. 8, the step S400 may include the following steps S410 to S440.

Step S410: performing contour detection processing on the target area using a contour detection algorithm to obtain at least one contour.

For example, in some embodiments, contour detection processing is performed on the target area using the contour detection algorithm such as the findContours function of OpenCV to extract at least one contour. For example, in some embodiments, contour detection processing may be performed on the above binary image (including the target area). For example, in some embodiments, during contour detection processing, contours of content such as texts or images in the target area (that is, the blackboard-writing area) may also be extracted.

For example, each contour includes a corresponding contour list which includes information about all the corner points of the candidate contour (such as coordinate positions of the corner points).

Step S420: selecting the at least one contour to obtain at least one candidate contour.

For example, in some embodiments, at least one contour may be selected according to the following selecting principles: (1) an area enclosed by the contour is larger; and (2) the perimeter of the area enclosed by the contour is larger. The principle is that the contour with a larger area or a larger perimeter in the target area is usually related to edges and corner points of the blackboard-writing area.

Step S430: determining a candidate corner point set based on the at least one candidate contour.

For example, in some embodiments, the angle value of the vertex angle corresponding to each corner point may be calculated based on the contour list of the at least one candidate contour, and a candidate corner point set may be obtained by selecting. In practical applications, each contour list usually includes a plurality of corner points, but it is not possible to determine which corner point corresponds to the vertex of the blackboard-writing area. Due to chaotic background edge information, corner points that do not belong to the blackboard-writing area might appear in the contour list. For example, for the vertices of the blackboard-writing area (which includes four vertices), the following prior information may usually be determined: an angle change at the vertices of the blackboard-writing area is greater than an angle change at the corner points of a parallel line.

Figure 9A:
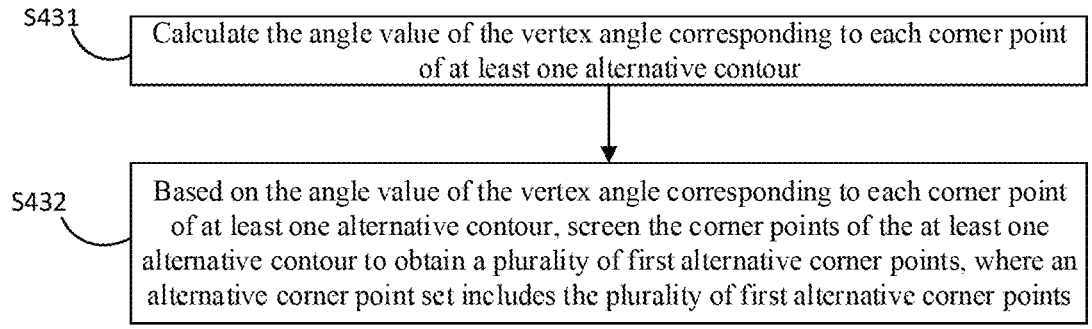
FIG. 9A is an example flowchart corresponding to step S430 shown in FIG. 8 according to at least some embodiments of the present disclosure.

FIG. 9A is an example flowchart corresponding to step S430 shown in FIG. 8 according to at least some embodiments of the present disclosure. For example, in some embodiments, as shown in FIG. 9A, the step S430 may include the following steps S431 to S432.

Step S431: calculating an angle value of a vertex angle corresponding to each corner point of at least one candidate contour.

For example, in some embodiments, coordinate positions of each corner point and two adjacent corner points may be determined based on a contour list of each candidate contour. Taking a certain corner point B as an example, the two adjacent corner points to corner point B are corner point A and corner point C. The coordinates of corner points A, B and C are $(x_A, y_A)$, $(x_B, y_B)$ and $(x_c, y_c)$, and a corresponding vertex angle of corner point B is ∠ABC. Therefore, sizes of the three sides a, b and c of a triangle formed by corner points A, B and C are:

$$\begin{cases} a = \sqrt{(x_B - x_C)^2 - (y_B - y_C)^2} \\ b = \sqrt{(x_C - x_A)^2 - (y_C - y_A)^2} \\ c = \sqrt{(x_A - x_B)^2 - (y_A - y_B)^2} \end{cases},$$

The angle value of the vertex angle ∠ABC corresponding to corner point B may be calculated according to the following formula (triangle cosine theorem):

$$\cos\beta = \frac{a^2 + c^2 - b^2}{2*a*c},$$

where β represents an angle value of the vertex angle ∠ABC corresponding to corner point B.

Step S432: selecting corner points of the at least one candidate contour to obtain a plurality of first candidate corner points based on the angle value of the vertex angle corresponding to each corner point of at least one candidate contour, where an candidate corner point set includes the plurality of first candidate corner points.

For example, for a blackboard-writing area that has no distortion in theory, the vertex angles corresponding to four vertices of the area are all right angles. However, considering image distortion, the vertex angle corresponding to each vertex of the blackboard-writing area in the input image may slightly deviate from the right angle. For example, in some embodiments, a corner point with a vertex angle value in a preset angle range may be used as a first candidate corner point. For example, a preset angle range may be set according to actual needs, which is not restricted in the embodiments of the present disclosure. For example, in some embodiments, the preset angle range may be set as 60° to 135° or 75° to 125°. Therefore, the corner points (that is, a plurality of first candidate corner points) in the candidate corner point set obtained by selecting are likely to be located near a vertex in the blackboard-writing area (including a case where a corner point itself is a vertex in the blackboard-writing area).

For example, in other embodiments, quadrilateral fitting may be performed on each candidate contour based on the contour list of the at least one candidate contour to obtain an candidate corner point set. For example, the candidate contours obtained in step S420 are usually polygons of different shapes. By performing quadrilateral fitting on each candidate contour and using four vertices of the fitted quadrilateral as candidate corner points (such as second candidate corner points), a data size of the candidate corner point set may be reduced, which is beneficial for improving an operating speed of the image processing method.

Figure 9B:
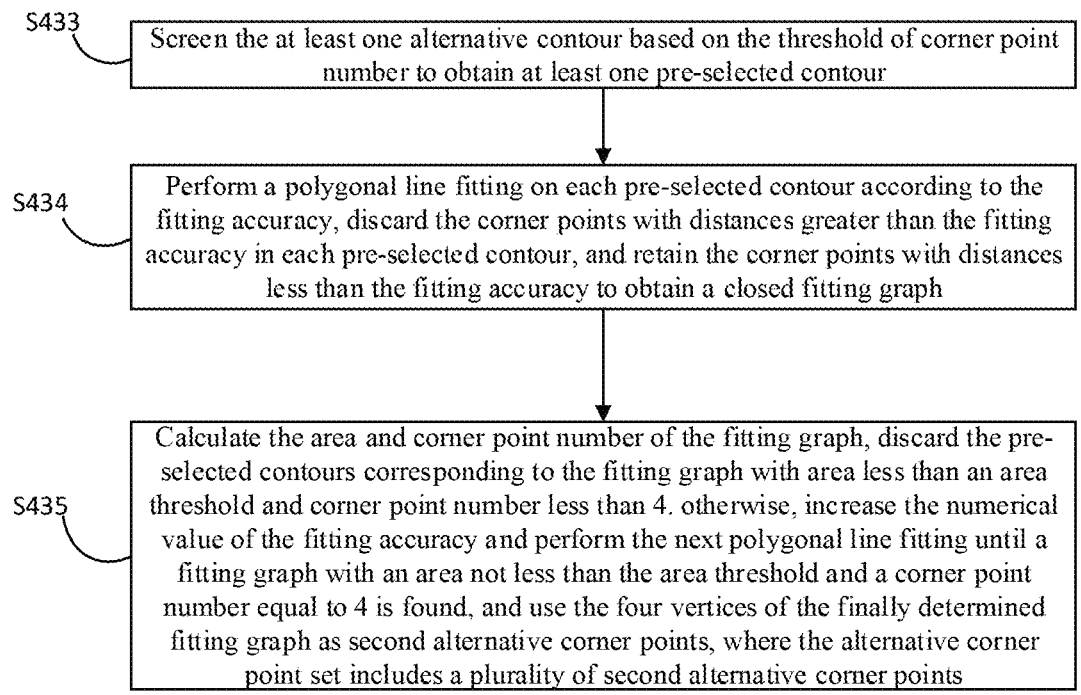
FIG. 9B is another example flowchart corresponding to step S430 shown in FIG. 8 according to at least some embodiments of the present disclosure.

FIG. 9B is another example flowchart corresponding to step S430 shown in FIG. 8 according to at least some embodiments of the present disclosure. For example, in some embodiments, as shown in FIG. 9B, the step S430 may include the following steps S433 to S435.

Step S433: selecting at least one candidate contour based on a threshold of a number of corner points to obtain at least one pre-selected contour.

For example, even considering image distortion, the contour corresponding to the blackboard-writing area in the input image usually does not include too many corner points.

Therefore, it may be considered that candidate contours with a number of corner points greater than a threshold of the number of corner points are likely to not include the vertices of the blackboard-writing area. For example, the threshold of the number of corner points may be set according to actual needs, which is not restricted in the embodiments of the present disclosure. For example, in some embodiments, a value range of the threshold of the number of corner points may be set as [6, 10], for example, the threshold of the number of corner points may be set as 8, but not limited to this.

Step S434: performing a polygonal line fitting on each pre-selected contour according to a fitting accuracy, discarding the corner points with distances greater than the fitting accuracy in each pre-selected contour, and retaining the corner points with distances less than the fitting accuracy to obtain a closed fitting graph.

For example, in some embodiments, the fitting accuracy (that is, an initial value of the fitting accuracy) during the first polygonal line fitting process may be set as b0*Length, where b0>0 and b0<1, and Length represents a perimeter of the corresponding pre-selected contour. For example, in some embodiments, a value range of b0 may be set as [0.005,0.02], for example, b0 may be set as 0.01, but not limited to this.

Step S435: calculating an area and a number of corner points of the fitting graph, discarding the pre-selected contours corresponding to the fitting graph with an area less than an area threshold and a number of corner points less than 4; Otherwise, increasing a numerical value of the fitting accuracy and performing a next polygonal line fitting until a fitting graph with an area not less than the area threshold and a number of corner points equal to 4 is found, and using the four vertices of a finally determined fitting graph as second candidate corner points, where the candidate corner point set includes a plurality of second candidate corner points.

For example, the area threshold may be set according to actual needs, which is not restricted in the embodiments of the present disclosure. For example, in some embodiments, a fixed parameter c0 (c0>0 and c0<1) may be set, and the area S0 of the target area may be calculated based on the target area determined in step S300 (for example, specifically, the target area determined in step S343), and the area threshold c0*S0 is calculated. For example, the value of c0 may be set according to actual needs, which is not restricted in the embodiments of the present disclosure. For example, in some embodiments, the value range of c0 may be set as [0.1, 0.3], for example, c0 may be set as 0.2, but not limited to this. Certainly, in some embodiments, in order to improve the operating speed, the area S0 of the target area may be replaced with the area of the bounding rectangular box of the target area.

For example, in some embodiments, when the initial value of the fitting accuracy is set as b0*Length, the fitting accuracy during each subsequent polygonal line fitting process may be increased by, such as 0.5*b0*Length, on the basis of the fitting accuracy during a previous polygonal line fitting process.

For example, in some embodiments, the above two methods may be used simultaneously to achieve an operation of step S430, that is, step S430 may include the steps S431 to S435. In this case, the candidate corner point set includes a plurality of first candidate corner points and a plurality of second candidate corner points, and accordingly, an accuracy of the four vertices of the target area determined in the subsequent step S440 may be improved.

For example, the candidate corner point set obtained in step S430 includes a plurality of corner points distributed close to each vertex of the blackboard-writing area.

Step S440: determining four vertices of the target area based on the candidate corner point set.

For example, in some embodiments, first clustering operation may be performed on the corner points (that is, the first candidate corner points and/or the second candidate corner points) in the candidate corner point set to obtain four cluster centers, and using the four cluster centers as the four vertices of the target area. For example, in some embodiments, a K-means clustering algorithm may be used for the first clustering operation.

For example, main steps of the K-means clustering algorithm include: dividing predicted data (that is, the candidate corner point set) into K groups, randomly selecting K objects (that is, the corner points in the candidate corner point set) as initial cluster centers, then calculating a distance between each object and each seed cluster center, and assigning each object to the nearest cluster center. Each cluster center and the object assigned to the cluster center represent one cluster. Each time a sample is assigned, the cluster centers of clusters are recalculated based on the existing objects in the clusters. This process will continue to repeat until a certain termination condition is met. The termination condition may be that no (or a minimum number of) objects are reassigned to different clusters, no (or a minimum number of) cluster centers change again, or a sum of squared errors is locally minimized.

For example, in an embodiment of the present disclosure, the K value is set as 4, and all corner points in the alternative corner set are classified into 4 categories, and a distance used in the clustering process is the Euclidean distance (specifically, the Euclidean distance in two-dimensional space). For example, the Euclidean distance between coordinate positions of samples to be classified and coordinate positions of the cluster centers may be calculated, where the coordinate positions are all coordinate positions in the image coordinate system. Finally, four cluster centers may be obtained as the four vertices of the target area, that is, the four vertices of the blackboard-writing area are predicted. That is to say, calibration of the distorted blackboard-writing area in the input image is achieved.

Step S500: performing coordinate transformation on the target area to obtain a corrected blackboard-writing area image according to the four vertices of the target area.

For example, the corrected blackboard-writing area image is usually a rectangle corresponding to an actual blackboard-writing area. For example, in some embodiments, the coordinate transformation operation in step S500 may be performed based on constraint conditions, where the constraint conditions include: the corrected blackboard-writing area image being a rectangle, and the four vertices of the target area correspond to the four vertices of the rectangle after coordinate transformation.

For example, in some embodiments, a coordinate transformation matrix may be calculated based on the constraint conditions by using the following coordinate transformation formula:

$$\begin{cases} U = \dfrac{a11*X + a21*Y + a31}{a13*X + a23*Y + a33} \\ V = \dfrac{a12*X + a22*Y + a32}{a13*X + a23*Y + a33} \end{cases},$$

where (U,V) represents coordinates in the corrected blackboard-writing area image, (X,Y) represents coordinates in the input image, a11, a21, a31, a12, a22, a32, a13, a23 and a33 form a 3×3 transformation matrix, and a33=1. For example, the transformation matrix may be determined based on the coordinate transformation formula, the coordinate positions of the four vertices of the target area in the input image, and corresponding relationship between the coordinate positions of the four vertices of the corrected blackboard-writing area image. Then, according to the coordinate transformation formula, coordinate transformation is performed on each pixel in the target area and partial areas around the target area to obtain each pixel in the corrected blackboard-writing area image. Thus, correction of the distorted blackboard-writing area in the input image is achieved.

Figure 10A:
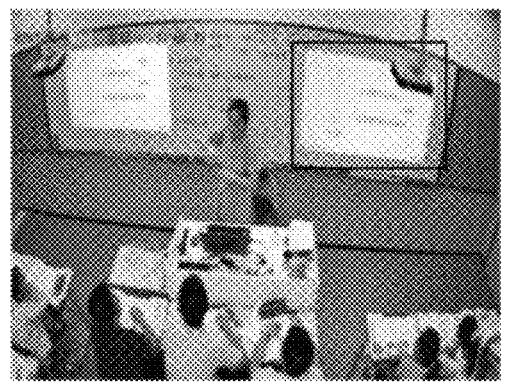
FIG. 10A is a schematic diagram of an input image according to at least some embodiments of the present disclosure.
Figure 10B:
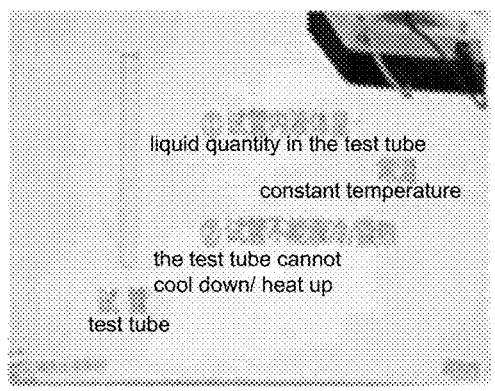
FIG. 10B is a schematic diagram of a corrected blackboard-writing area image obtained by processing the input image shown in FIG. 10A according to the image processing method shown in FIG. 1.

FIG. 10A is a schematic diagram of an input image provided by at least some embodiments of the present disclosure, and FIG. 10B is a schematic diagram of a corrected blackboard-writing area image obtained by processing the input image shown in FIG. 10A with the image processing method shown in FIG. 1. It should be noted that FIG. 10B only shows, by example, the corrected blackboard-writing area image obtained by processing the blackboard-writing area (that is, the PPT area shown in the box of FIG. 10A) on the right side of the input image shown in FIG. 10A using the image processing method shown in FIG. 1. For example, compared to the input image shown in FIG. 10A, the corrected blackboard-writing area image shown in FIG. 10B may assist students in focusing their viewing interests on the blackboard-writing area, thereby improving learning efficiency.

It should be noted that for classroom teaching videos that include a plurality of frames of images, an existence of factors such as character occlusion or light changes might lead to inconsistent output results (i.e. the vertex coordinates of the calibrated blackboard-writing area) for different frames of images. To solve the problem, a second verification method may be used to reconfirm the coordinates of the four vertices of the target area that is, the blackboard-writing area).

Figure 11:
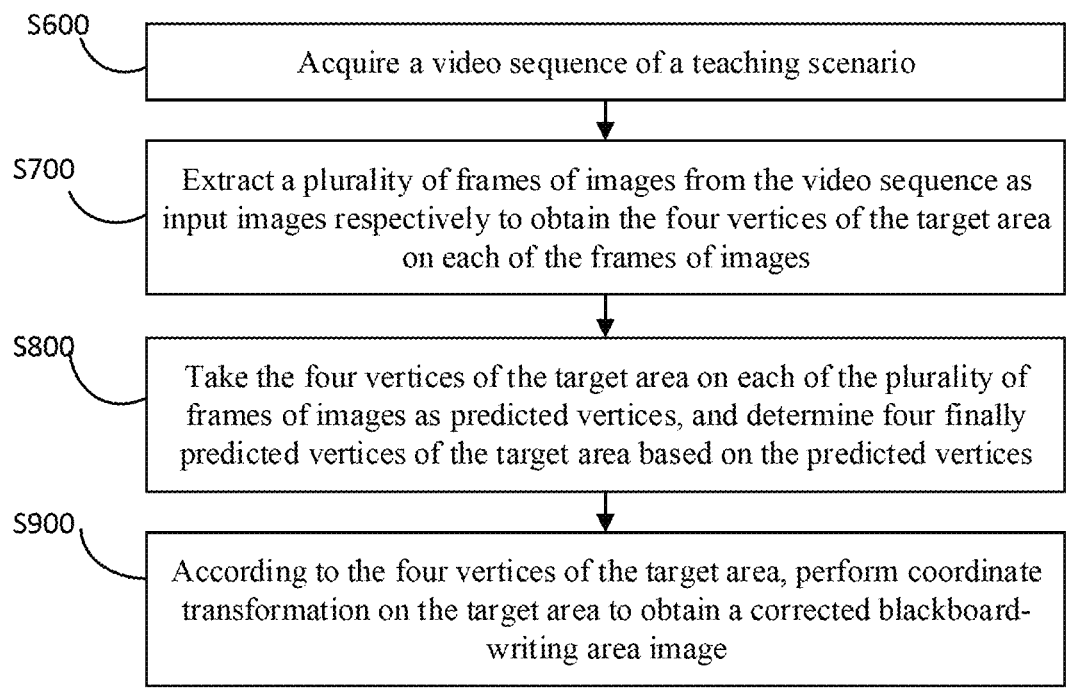
FIG. 11 is a flowchart of another image processing method according to at least some embodiments of the present disclosure.

FIG. 11 is a flowchart of another image processing method according to at least some embodiments of the present disclosure. For example, as shown in FIG. 11, the image processing method includes the following steps S600 to S900.

Step S600 acquiring a video sequence of a teaching scenario.

For example, similar to the operation in step S100, a video sequence may be obtained by shooting in a direction of a podium of a teaching scenario through a camera. For example, the video sequence typically includes a plurality of frames of images. For example, there might be problems in some frames of images where the vertices of the blackboard-writing area are obstructed by characters (such as teachers), resulting in inaccurate calibration of the positions of the vertices of the blackboard-writing area during the blackboard-writing area calibration of the frames of images (that is, there may be inaccurate predicted vertices). Furthermore, correcting the blackboard-writing area based on the inaccurate predicted vertices might lead to a result that distortion still exists in the corrected blackboard-writing area image, which is not conducive to improving a viewing effect.

Step S700: extracting a plurality of frames of images from the video sequence as input images respectively to obtain the four vertices of the target area on each of the frames of images.

For example, in some embodiments, 10 to 20 frames of images may be randomly extracted from the video sequence as the input images, and the present disclosure includes but is not limited to this.

For example, after taking each extracted frame of image as the input image, the operation of step S700 may be implemented by using steps S100 to S500. The specific implementation process and details may refer to relevant descriptions mentioned above, and will not be repeated here.

Step S800: using the four vertices of the target area on each of the plurality of frames of images as predicted vertices, and determining four finally predicted vertices of the target area based on the predicted vertices.

Figure 12:
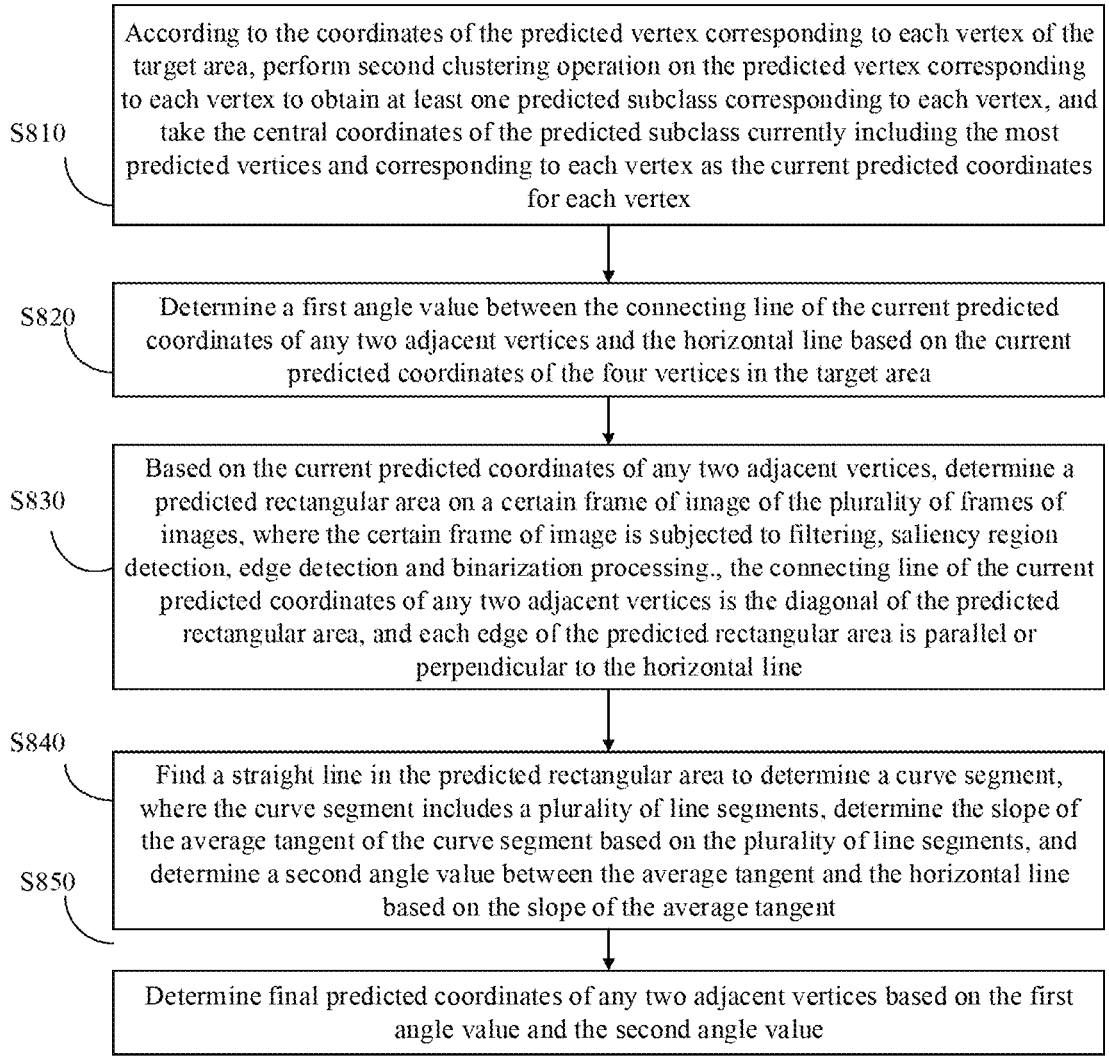
FIG. 12 is another example flowchart corresponding to step S800 shown in FIG. 11 according to at least some embodiments of the present disclosure.

For example, in some embodiments, as shown in FIG. 12, the step S800 may include the following steps S810 to S850.

Step S810: performing a second clustering operation on the predicted vertex corresponding to each vertex to obtain at least one predicted subclass corresponding to each vertex according to the coordinates of the predicted vertex corresponding to each vertex of the target area, and using the central coordinates of the predicted subclass currently including the most predicted vertices and corresponding to each vertex as current predicted coordinates of each vertex.

For example, in some embodiments, the Euclidean distance between any two predicted vertices of a plurality of predicted vertices corresponding to each vertex may be calculated, and a certain predicted vertex and predicted vertices around, such as within three pixels, are classified into a predicted subclass, a central point of the predicted subclass is taken as a predicted vertex in a next step, and the operation is repeated until no predicted vertices are reassigned to different predicted subclasses, or no central coordinates of the predicted subclasses change again, or a sum of squared errors is locally minimized. Thus, the second clustering operation may be achieved.

Step S820: determining a first angle value between a connecting line of the current predicted coordinates of any two adjacent vertices and a horizontal line based on the current predicted coordinates of the four vertices in the target area.

For example, in some embodiments, a slope of the connecting line of the current predicted coordinates of any two adjacent vertices may be calculated, and a first angle value between the connecting line and the horizontal line may be determined based on the slope and the trigonometric formula. It should be noted that when the slope tends towards infinity, it indicates that the connecting line is perpendicular to the horizontal line, that is, the first angle value between the connecting line and the horizontal line is 90°.

For example, in other embodiments, a certain pixel coordinate may be taken in a direction, parallel to the horizontal line, of the current predicted coordinates of a certain vertex, an angle value between the connecting line of the current predicted coordinates of two adjacent vertices and a connecting line between the current predicted coordinates of the certain vertex and the certain pixel coordinate may be calculated according to the triangle cosine theorem, and then a first angle value between the connecting line of the current predicted coordinates of two adjacent vertices and the horizontal line may be obtained.

Step S830: determining a predicted rectangular area on a certain frame of image of the plurality of frames of images based on the current predicted coordinates of any two adjacent vertices, where the certain frame of image is subjected to filtering, saliency region detection, edge detection and binarization processing, the connecting line of the current predicted coordinates of any two adjacent vertices is a diagonal of the predicted rectangular area, and each edge of the predicted rectangular area is parallel or perpendicular to the horizontal line.

For example, the filtering, the saliency region detection, the edge detection and the binarization processing in step S830 may refer to relevant descriptions in steps S310, S320 and S330 mentioned above. A specific implementation process and details will not be repeated here. For example, a binary image may be obtained from the certain frame of image after the above processing, so that the predicted rectangular area may be determined on the binary image, and the predicted rectangular area includes edge pixels (such as finally selected edge pixels) of the target area (that is, the blackboard-writing area). Considering image distortion, in the predicted rectangular area, a boundary of the blackboard-writing area is no longer horizontal or vertical, but rather a curved arc segment.

Step S840: finding a straight line in the predicted rectangular area to determine a curve segment, where the curve segment includes a plurality of line segments, determining a slope of an average tangent of the curve segment based on the plurality of line segments, and determining a second angle value between the average tangent and the horizontal line based on the slope of the average tangent.

For example, in some embodiments, the step S840 may include the following steps S841 to S843.

Step S841: converting line segments formed by edge pixels in the predicted rectangular area from the Cartesian coordinate system to the Hough space to determine a plurality of line segments.

For example, a straight line in the Cartesian coordinate system corresponds to a point in the Hough space. If points in the Cartesian coordinate system are collinear, straight lines corresponding to these points in the Hough space intersect at one point. Therefore, straight lines in Cartesian coordinate system may be detected based on this characteristic. Compared with other methods for finding straight lines, this method may better reduce noise interference. It should be noted that according to step (1), many discontinuous line segments may usually be obtained in the predicted rectangular area.

Step S842: judging whether the plurality of line segments belong to the same curve based on whether beginning and ending positions of the line segments overlap or are close to determine a curve segment.

For example, in step S842, a threshold for determining whether the beginning and ending positions of the line segments overlap or are close may be set according to actual needs. For example, the threshold can be set as, for example, 5 pixels, that is, if a distance between one endpoint of a line segment and one endpoint of another line segment is within 5 pixels, it is considered that the beginning and ending positions of the two line segments overlap or are close. According to step (2), a curve segment may be determined, which corresponds to the boundary of the blackboard-writing area in the input image.

Step S843: calculating an average slope of all line segments in the curve segment as the slope of the average tangent of the curve segment, and determining a second angle value between the average tangent and the horizontal line based on the slope of the average tangent.

For example, the average slope of all line segments in the curve segment may be calculated based on the following formula:

$$k = \frac{1}{n}\sum_{i=1}^{n} \frac{y_2^i - y_1^i}{x_2^i - x_1^i}$$

where k represents the average slope of all line segments in the curve segment, n represents the number of all line segments in the curve segment, i represents the i-th line segment, and $(x_1^i, y_1^i)$ and $(x_2^i, y_2^i)$ represent the coordinates of both ends of the line segment. Then, the second angle value between the average tangent of the curve segment and the horizontal line may be determined based on the trigonometric formula.

Step S850: determining final predicted coordinates of any two adjacent vertices based on the first angle value and the second angle value.

For example, in some embodiments, the step S850 may include the following step (1).

Step (1): in response to a difference between a first angle value and a second angle value being not greater than a first threshold, taking the current predicted coordinates of the any two adjacent vertices as the final predicted coordinates of the any two adjacent vertices. For example, the first threshold may be set according to actual needs, which is not restricted in the embodiments of the present disclosure. For example, in some embodiments, the first threshold may be set as 3° for example, but not limited to this.

For example, in some embodiments, the step S850 may further include the following steps (2)- to (4).

Step (2): in response to the difference between a first angle value and a second angle value being greater than a first threshold, judging whether a minimum distance between the current predicted coordinates of any two adjacent vertices and the curve segment is not greater than a second threshold. For example, if the difference between the first angle value and the second angle value is greater than the first threshold, it means that the current predicted coordinates of at least one of the two adjacent vertices has a prediction error, and the current predicted coordinates are not suitable as its final predicted coordinates. There are two situations here: one is that the current predicted coordinates of only one vertex have a prediction error, and the other is that the current predicted coordinates of both vertices have prediction errors. The following steps (3) and (4) may be used to handle the two situations respectively based on a judgment result. For example, the minimum distance between the current predicted coordinates of each vertex and the curve segment is the smallest distance between the current predicted coordinates of each vertex and all line segments of the curve segment. For example, the distance between the current predicted coordinates of each vertex and each line segment may be calculated using the Euclidean distance.

Step (3): in response to determining that the minimum distance between the current predicted coordinates of one of the any two adjacent vertices and the curve segment is not greater than the second threshold and the minimum distance between the current predicted coordinates of the other of the any two adjacent vertices and the curve segment is greater than the second threshold, determining a first straight line passing through the current predicted coordinates of one of the any two adjacent vertices based on the slope of the average tangent, at the same time, determining a second straight line based on the current predicted coordinates of the vertex opposite to one of the any two adjacent vertices and the current predicted coordinates of the other of the any two adjacent vertices, taking the current predicted coordinates of one of the any two adjacent vertices as final predicted coordinates of the one of the any two adjacent vertices, and taking the coordinates of an intersection point of the first straight line and the second straight line as final predicted coordinates of the other of the any two adjacent vertices. It should be understood that the vertex opposite to one of the two adjacent vertices is a vertex that is adjacent to the other of the two adjacent vertices and that is different from one of the two adjacent vertices.

Step (4): in response to determining that the minimum distance between the current predicted coordinates of each of the any two adj acent vertices and the curve segment is greater than the second threshold, discarding the predicted subclass currently including the most predicted vertices and corresponding to each of the any two adjacent vertices, and taking central coordinates of the remaining predicted subclasses including the most predicted vertices and corresponding to each of the any two adjacent vertices as the current predicted coordinates of each of the any two adjacent vertices until the final predicted coordinates of each vertex in the any two adjacent vertices are determined.

For example, in rare cases, it may still be impossible to determine the final predicted coordinates of the four vertices of the target area (i.e., the four final predicted vertices in the target area are unable to be determined) according to steps (1) to (4) above. Therefore, in some embodiments, the step S850 may further include the following step (5).

Step (5): in response to determining that the entire predicted subclasses corresponding to any two adjacent vertices are discarded, determining the average tangent of the curve segment corresponding to the any two adjacent vertices based on the slope of the average tangent of the curve segment corresponding to the any two adjacent vertices, determining a third straight line based on the current predicted coordinates of the vertex opposite to one of the any two adjacent vertices and the current predicted coordinates of the other of the any two adjacent vertices, determining a fourth straight line based on the current predicted coordinates of the vertex opposite to the other of the any two adjacent vertices and the current predicted coordinates of one of the any two adjacent vertices, taking coordinates of an intersection point of the average tangent and the third straight line as the final predicted coordinates of one of the any two adjacent vertices, and taking coordinates of the intersection point of the average tangent and the fourth straight line as the final predicted coordinates of the other of the any two adjacent vertices.

It should be understood that a determination method of the second straight line in step (3) may refer to relevant descriptions in steps (1) to (5), and will not be repeated here. Similarly, a determination of the third and fourth lines in step (5) may also refer to the relevant descriptions in steps (1) to (5), and will not be repeated here. It should also be understood that in step (4), under the condition that the central coordinates of the remaining predicted subclasses containing the most predicted vertices and corresponding to each of the any two adjacent vertices are taken as the current predicted coordinates of each vertex in the any two adjacent vertices, a process of redetermining the final predicted coordinates of each of the any two adjacent vertices may refer to relevant descriptions of steps S820 and S850 such as steps (1) to (5) mentioned above, it should also be understood that in this process, the second angle value previously determined based on steps S830 and S840 may be directly used, thereby avoiding a need to repeat steps S830 and S840. It should be understood that according to steps S810 to S850 above, the final predicted coordinates of the four vertices of the target area may be determined, that is, the four final predicted vertices of the target area may be determined.

Step S900: performing coordinate transformation on the target area to obtain a corrected blackboard-writing area image according to the four vertices of the target area.

For example, an operation of step S900 may refer to relevant description of step S500 mentioned above, and the specific implementation process and details will not be repeated here. For example, in some embodiments, corrected video sequence may be obtained based on the corrected blackboard-writing area image corresponding to each frame of image of the video sequence.

Figure 13A:
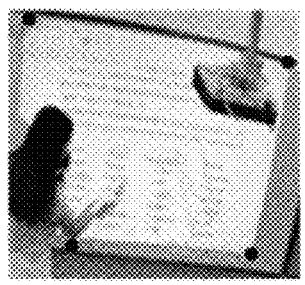
FIG. 13A is a schematic block diagram of an input image according to at least some embodiments of the present disclosure.
Figure 13B:
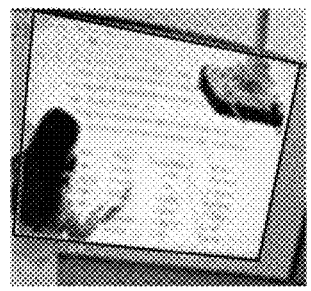
FIG. 13B is a schematic diagram of the quadrilateral boundary of the target area in the input image shown in FIG. 13A.
Figure 13C:
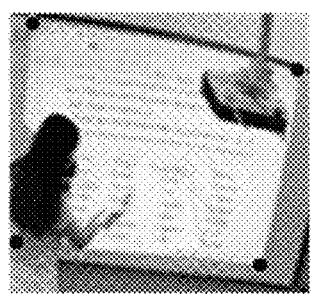
FIG. 13C is a schematic diagram of the four vertices of the target area in the input image shown in FIG. 13A.

FIG. 13A is a schematic block diagram of an input image according to at least some embodiments of the present disclosure, FIG. 13B is a schematic diagram of a quadrilateral boundary of the target area (that is, the blackboard-writing area) in the input image shown in FIG. 13A, and FIG. 13C is a schematic diagram of the four vertices of the target area (that is, the blackboard-writing area) in the input image shown in FIG. 13A. For example, FIG. 13A shows the four vertices of the target area determined using the image processing method shown in FIG. 1 (as shown by the black dots in FIG. 13A), where the vertex in the lower left corner of FIG. 13A deviates significantly from a true position of the vertex in the lower left corner due to character occlusion. For example, FIG. 13A shows a frame of image in a certain video sequence, while the remaining frames of images in the video sequence are not shown. For example, FIG. 13B shows a quadrilateral boundary of the target area determined using the image processing method shown in FIG. 11, where each edge of the quadrilateral boundary is one of: a connecting line of two adjacent vertices, the first straight line, the second straight line, the third straight line and the fourth straight line. For example, FIG. 13C shows the four vertices of the target area determined using the image processing method shown in FIG. 11 (that is, the four final predicted vertices, as shown by the black dots in FIG. 13C). Compared to FIG. 13A, the vertex in the lower left corner of FIG. 13C is closer to a true position of the vertex in the lower left corner. Therefore, the image processing method shown in FIG. 11 may solve a problem of inconsistent output results (that is, vertex coordinates of the calibrated blackboard-writing area) corresponding to different frames of images due to factors such as character occlusion or light changes.

It should be noted that in an embodiment of the present disclosure, the process of the image processing method may include more or fewer operations, which may be executed sequentially or in parallel. Although the process of the image processing method described above includes a plurality of operations that appear in a specific order, it should be clearly understood that the order of the plurality of operations is not limited. The image processing method described above may be executed once or a plurality of times according to predetermined conditions.

According to the image processing method provided in the embodiments of the present disclosure, the corrected blackboard-writing area image may be obtained by calibrating and correcting the distorted blackboard-writing area in the input image. The image processing method only requires the use of low-cost fixed cameras and does not require installation of additional equipment. It has high practicality and is suitable for large-scale popularization and promotion. At the same time, there is no need for manual data annotation of input images, nor is there a need to place a calibration board and perform camera calibration in a teaching scenario, which may greatly save labor costs. Furthermore, specific processing of the corresponding area may be assisted based on the automatic annotation and correction results of the blackboard-writing area, for example, students may be assisted in focusing viewing interests on the blackboard-writing area.

Figure 14:
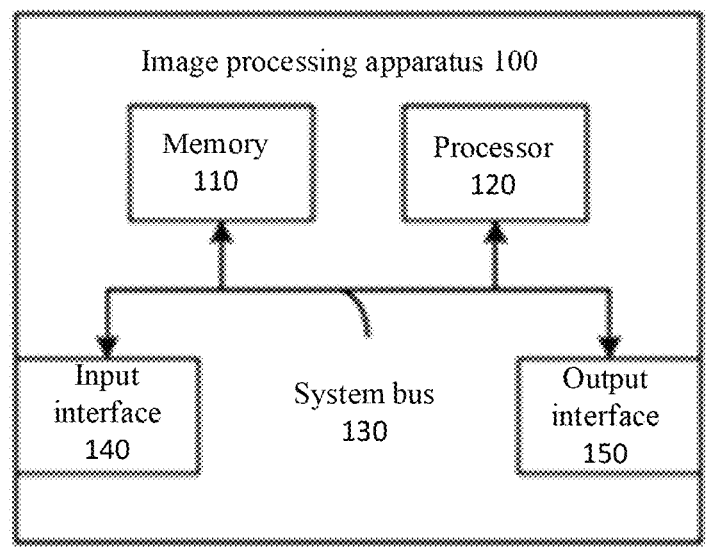
FIG. 14 is a schematic block diagram of an image processing apparatus according to at least some embodiments of the present disclosure.

At least some embodiments of the present disclosure further provide an image processing apparatus. FIG. 14 is a schematic block diagram of an image processing apparatus according to at least some embodiments of the present disclosure. For example, as shown in FIG. 14, the image processing apparatus 100 includes a memory 110 and a processor 120.

For example, the memory 110 is configured for non-transitory storage of computer-readable instructions, the processor 120 is configure to run the computer-readable instructions, and the processor 120, when executing the computer-readable instructions, performs the image processing method provided in any embodiment of the present disclosure.

For example, a memory 110 and a processor 120 may communicate with each other directly or indirectly. For example, in some embodiments, as shown in FIG. 2, the image processing apparatus 100 may further include a system bus 130, where the memory 110 and the processor 120 may communicate with each other through the system bus 130. For example, the processor 120 may access the memory 110 through the system bus 130. For example, in other embodiments, components such as the memory 110 and the processor 120 may communicate through network connections. Networks may include wireless networks, wired networks, and/or any combination of the wireless and wired networks. Networks may include local area networks, internet, telecommunications networks, Internet of Things based on internet and/or telecommunications networks, and/or any combination of the above networks. The wired networks may use twisted pair, coaxial cable or fiber optic transmission for communication, while the wireless networks may use 3G/4G/5G mobile communication networks, Bluetooth, Zigbee or WiFi for communication. Types and functions of the networks are not limited in the present disclosure.

For example, the processor 120 may control other components in the image processing apparatus to perform desired functions. The processor 120 may be a device with data processing capability and/or program execution capability, such as a CPU (Central Processing Unit), a TPU (Tensor Processing Unit) or a GPU (Graphic Processing Unit). The CPU may adopt X86 or ARM architecture. The GPU may be directly integrated into a mainboard separately or built into the Northbridge chip of the mainboard. The GPU may also be built into the CPU.

For example, the memory 110 may include one or any combination of more computer program products which may include various forms of computer-readable storage medium, such as volatile memories and/or non-volatile memories. The volatile memories may include, for example, RAM (Random Access Memory) and/or cache memory. The non-volatile memory may include, for example, ROM (Read-Only Memory), hard disk, EPROM (Erasable Programmable Read-Only Memory), portable CD-ROM (Compact Disc-Read-Only Memory), USB memory, flash memory, and the like.

For example, one or more computer instructions may be stored on the memory 110, and the processor 120 may execute the computer instructions to achieve various functions. In the computer-readable storage medium, various applications and data may also be stored, such as input images, video sequences, corrected blackboard-writing area images and various data used and/or generated by applications.

For example, the processor 120, when executing some computer instructions stored in the memory 110, performs one or more steps in the image processing method described above.

For example, as shown in FIG. 14, the image processing apparatus 100 may further include an input interface 140 that allows external devices to communicate with the image processing apparatus 100. For example, the input interface 140 may be used to receive instructions or data (such as input images, video sequences, and the like) from external computer devices, users, and the like. The image processing apparatus 100 may also include an output interface 150 that interconnects the image processing apparatus 100 and one or more external devices. For example, the image processing apparatus 100 may output image processing results (such as corrected blackboard-writing area images) and the like through the output interface 150. External devices that communicate with the image processing apparatus 100 through the input interface 140 and the output interface 150 may be included in an environment that provides any type of user interfaces with which users may interact. Examples of user interface types include a graphical user interface, a natural user interface, and on the like. For example, the graphical user interface may receive input from input devices such as keyboards, mice, remote controls and the like, and provide output on output devices such as displays. In addition, the natural user interface may enable a user to interact with the image processing apparatus 100 in a manner that does not require constraints imposed by the input devices such as the keyboards, the mice, the remote controls and the like. Instead, the natural user interface may rely on voice recognition, touch and stylus recognition, gesture recognition on and near the screen, mid-air gestures, head and eye tracking, voice and semantics, vision, touch, gestures and machine intelligence.

In addition, although the image processing apparatus 100 is shown as a single system in FIG. 14, it may be understood that the image processing apparatus 100 may also be a distributed system, and may also be arranged as a cloud facility (including public cloud or private cloud). Therefore, for example, a plurality of devices may communicate through network connections and jointly perform tasks described as being performed by the image processing apparatus 100. For example, in some embodiments, an input image or video sequence may be obtained through a client and may be uploaded to a server, the server performs image processing based on the received input image or video sequence, and then returns corrected blackboard-writing area image or corrected blackboard-writing area image sequence (that is, the corrected blackboard-writing area image corresponding to each frame of image of the video sequence) to the client, so as to provide to a user.

For example, a detailed explanation of the implementation process of the image processing method may refer to relevant descriptions in the embodiments of the image processing method mentioned above, and any repetition will not be repeated here.

For example, in some embodiments, the image processing apparatus may include, but is not limited to, smartphones, tablet computers, personal computers, PDAs (Personal Digital Assistants), wearable devices, head mounted display devices, servers, and the like.

It should be noted that the image processing apparatus provided by an embodiment of the present disclosure is illustrative rather than restrictive. According to practical application needs, the image processing apparatus may further include other conventional components or structures. For example, to achieve necessary functions of the image processing apparatus, those skilled in the art may set other conventional components or structures according to specific application scenarios. The embodiments of the present disclosure do not limit this.

A technical effect of the image processing apparatus provided by the embodiments of the present disclosure may refer to the corresponding description of the image processing method in the above embodiments, and will not be repeated here.

Figure 15:
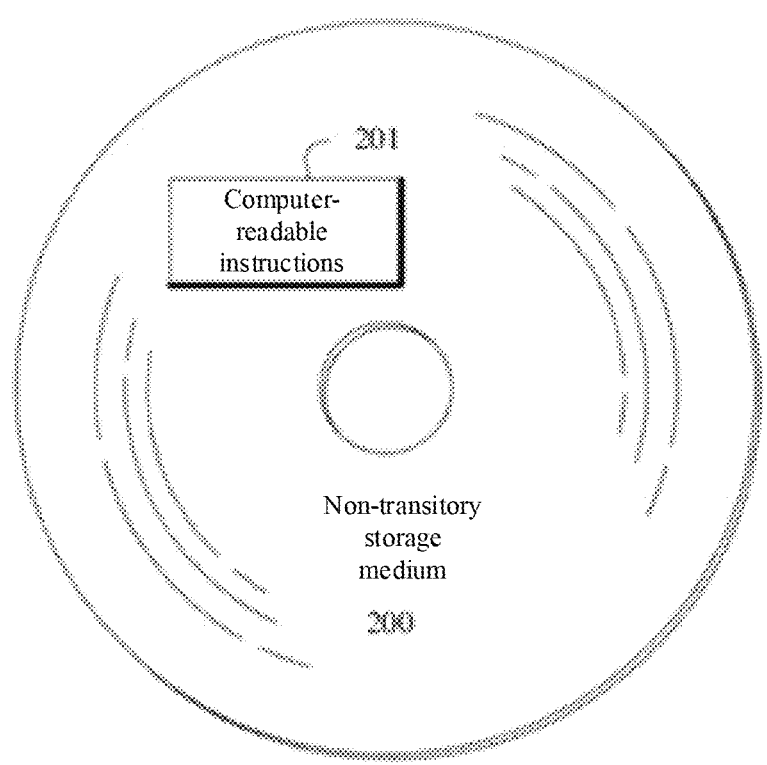
FIG. 15 is a schematic diagram of a non-transitory storage medium according to at least some embodiments of the present disclosure.

At least one embodiment of the present disclosure further provides a non-transitory storage medium. FIG. 15 is a schematic diagram of a non-transitory storage medium according to an embodiment of the present disclosure. For example, as shown in FIG. 15, the non-transitory storage medium 200 stores computer-readable instructions 201 non-transitorily, and the image processing method provided in any embodiment of the present disclosure may be executed when the non-transitory computer-readable instructions 201 are executed by a computer (including the processor).

For example, one or more computer instructions may be stored on the non-transitory storage medium 200. Some computer instructions stored on the non-transitory storage medium 200 may be, for example, instructions for performing one or more steps in the image processing method described above.

For example, non-transitory storage medium may include a storage component of a tablet computer, a hard disk of a personal computer, an RAM, an ROM, an EPROM, a CD-ROM, a flash memory, or any combination of the above storage media, or other applicable storage media.

The technical effect of the non-transitory storage medium provided by the embodiments of the present disclosure may refer to the corresponding description of the image processing method in the above embodiments, and will not be repeated here.

For the present disclosure, the following points need to be illustrated:

(1) in the accompanying drawings of the embodiments of the present disclosure, only the structures related to the embodiments of the present disclosure are involved, and other structures may refer to a usual design.

(2) The embodiments and features in the embodiments of the present disclosure may be combined with each other to obtain new embodiments without conflict.

The above are merely specific implementations of the present disclosure, but the scope of protection of the present disclosure is not limited thereto, and any changes or replacements easily conceivable by those skilled in the art within the scope of the technology disclosed herein shall be covered within the scope of protection of the present disclosure. Therefore, the protection scope of the present disclosure shall be subject to the protection scope of the claims.

What is claimed is:

1. An image processing method for correcting blackboard-writing area image, performed by an electronic device, comprising:
 acquiring an input image of a teaching scenario;
 performing detection on the input image to determine a rectangular detection area that comprises a blackboard-writing area;
 analyzing the rectangular detection area to determine a target area corresponding to the blackboard-writing area;

determining four vertices of the target area; and
performing coordinate transformation on the target area to obtain a corrected blackboard-writing area image according to the four vertices of the target area;
wherein determining the four vertices of the target area comprises:
performing contour detection processing on the target area using a contour detection algorithm to obtain at least one contour;
selecting the at least one contour to obtain at least one candidate contour;
determining a candidate corner point set based on the at least one candidate contour; and
determining the four vertices of the target area based on the candidate corner point set;
wherein the image processing method further comprises:
obtaining a video sequence of the teaching scenario;
extracting a plurality of frames of images from the video sequence as the input images to obtain the four vertices of the target area on each frame of image of the plurality of frames of images;
taking the four vertices of the target area on each frame of image of the plurality of frames of images as predicted vertices, and determining four final predicted vertices of the target area based on the predicted vertices; and
performing coordinate transformation on the target area in each frame of image of the video sequence to obtain a corrected blackboard-writing area image corresponding to each frame of image of the video sequence based on the four final predicted vertices of the target area;
wherein taking the four vertices of the target area on each frame of image of the plurality of frames of images as the predicted vertices, and determining the four final predicted vertices of the target area based on the predicted vertices comprises:
according to coordinates of the predicted vertices corresponding to each vertex of the target area, performing second clustering operation on the predicted vertices corresponding to each vertex to obtain at least one predicted subclass corresponding to each vertex, and taking central coordinates of predicted subclass currently including most predicted vertices and corresponding to each vertex as current predicted coordinates for each vertex;
determining a first angle value between a connecting line of current predicted coordinates of any two adjacent vertices and a horizontal line based on the current predicted coordinates of the four vertices of the target area;
determining a predicted rectangular area on a certain frame of image of the plurality of frames of images based on the current predicted coordinates of the any two adjacent vertices, wherein the certain frame of image is subjected to filtering, saliency region detection, edge detection and binarization processing—, the connecting line of the current predicted coordinates of the any two adjacent vertices is a diagonal of the predicted rectangular area, and each edge of the predicted rectangular area is parallel or perpendicular to the horizontal line;
finding a straight line in the predicted rectangular area to determine a curve segment, wherein the curve segment comprises a plurality of line segments, determining a slope of an average tangent of the curve segment based on the plurality of line segments, and determining a second angle value between the average tangent and the horizontal line based on the slope of the average tangent; and
determining final predicted coordinates of the any two adjacent vertices based on the first angle value and the second angle value.

2. The image processing method according to claim 1, wherein determining the candidate corner point set based on the at least one candidate contour comprises:
calculating angle values of vertex angles corresponding to each corner point of the at least one candidate contour; and
selecting each corner point of the at least one candidate contour to obtain a plurality of first candidate corner points based on the angle values of the vertex angles corresponding to each corner point of the at least one candidate contour, wherein the candidate corner point set comprises the plurality of first candidate corner points.

3. The image processing method according to claim 1, wherein determining the candidate corner point set based on the at least one candidate contour comprises:
selecting the at least one candidate contour according to a threshold of a number of corner points to obtain at least one pre-selected contour;
performing a polygonal line fitting on each pre-selected contour according to a fitting accuracy, discarding corner points with distances greater than the fitting accuracy in each pre-selected contour, and retaining corner points with distances less than the fitting accuracy to obtain a closed fitting graph; and
calculating an area and a number of corner points of the fitting graph, discarding pre-selected contours corresponding to the fitting graph with the area less than an area threshold and the number of corner points less than 4; otherwise, increasing a numerical value of the fitting accuracy and performing a next polygonal line fitting until a fitting graph with an area not less than the area threshold and a number of corner points equal to 4 is found; and taking the four vertices of a finally determined fitting graph as second candidate corner points, wherein the candidate corner point set comprises a plurality of second candidate corner points.

4. The image processing method according to claim 1, wherein determining the candidate corner point set based on the at least one candidate contour comprises:
calculating an angle value of vertex angles corresponding to each corner point of the at least one candidate contour;
selecting each corner point of the at least one candidate contour to obtain a plurality of first candidate corner points based on the angle values of the vertex angles corresponding to each corner point of the at least one candidate contour;
selecting the at least one candidate contour according to a threshold of—a number of corner points to obtain at least one pre-selected contour;
performing a polygonal line fitting on each pre-selected contour according to a fitting accuracy, discarding corner points with distances greater than the fitting accuracy in each pre-selected contour, and retaining corner points with distances less than the fitting accuracy to obtain a closed fitting graph; and
calculating an area and a number of corner points of the fitting graph, discarding pre-selected contours corresponding to the fitting graph with the area less than an area threshold and the number of corner points less than 4; otherwise, increasing a numerical value of the fitting accuracy and performing a next polygonal line fitting until a fitting graph with an area not less than the area threshold and a number of corner points equal to 4 is found, and taking the four vertices of a finally determined fitting graph as second candidate corner points, wherein the candidate corner point set comprises the plurality of first candidate corner points and a plurality of second candidate corner points.

5. The image processing method according to claim 1, wherein determining the four vertices of the target area based on the candidate corner point set comprises:
performing first clustering operation on the corner points in the candidate corner point set to obtain four cluster centers, and taking the four cluster centers as the four vertices of the target area.

6. The image processing method according to claim 5, wherein performing first clustering operation on the corner points in the candidate corner point set comprises:
using a K-means clustering algorithm for the first clustering operation, wherein K=4.

7. The image processing method according to claim 1, wherein analyzing the rectangular detection area to determine a target area corresponding to the blackboard-writing area comprises:
filtering the rectangular detection area to obtain a filtered image corresponding to the rectangular detection area, and obtaining a first grayscale image based on the filtered image;
performing saliency region detection processing on the first grayscale image to obtain a second grayscale image;
performing edge detection processing and binarization processing on the second grayscale image to obtain a binary image; and
performing connected area analysis processing on the binary image to determine the target area corresponding to the blackboard-writing area.

8. The image processing method according to claim 7, wherein filtering the rectangular detection area to obtain the filtered image corresponding to the rectangular detection area comprises:
filtering the rectangular detection area with a median filtering algorithm to obtain the filtered image corresponding to the rectangular detection area.

9. The image processing method according to claim 7 wherein performing saliency region detection processing on the first grayscale image to obtain the second grayscale image comprises:
calculating a global contrast of each pixel of the first grayscale image on the first grayscale image as a saliency value of each pixel; and
obtaining the second grayscale image based on the saliency values of all pixels of the first grayscale image on the first grayscale image, wherein a grayscale value of any pixel of the second grayscale image is a saliency value of a certain pixel of the first grayscale image corresponding to the any pixel of the first grayscale image.

10. The image processing method according to claim 7, wherein performing edge detection processing and binarization processing on the second grayscale image to obtain the binary image comprises:
calculating a grayscale gradient of all pixels of the second grayscale image to determine initially selected edge pixels;
performing a non-maximum suppression operation on the initially selected edge pixels to determine secondarily selected edge pixels;
performing a double-threshold filtering operation on the secondarily selected edge pixels to obtain finally selected edge pixels; and
performing the binarization processing on the second grayscale image according to the finally selected edge pixels to obtain the binary image.

11. The image processing method according to claim 7, wherein performing connected area analysis processing on the binary image to determine the target area corresponding to the blackboard-writing area comprises:
determining all connected areas on the binary image and a bounding rectangular box of each connected area;
selecting the connected areas with areas of the bounding rectangular boxes sorted in an order of 2nd to Nth from largest to smallest as candidate areas, wherein N is an integer greater than or equal to 2; and
verifying the candidate areas to determine the target area corresponding to the blackboard-writing area based on second prior knowledge of the blackboard-writing area.

12. The image processing method according to claim 11, wherein the second prior knowledge comprises:
a distance between central coordinates of the blackboard-writing area and central coordinates of the binary image being less than a distance threshold; and
an aspect ratio of the blackboard-writing area being within a second range.

13. The image processing method according to claim 1, wherein performing detection on the input image to determine a rectangular detection area that comprises a blackboard-writing area comprises:
verifying the rectangular detection area based on first prior knowledge of the blackboard-writing area.

14. The image processing method according to claim 13, wherein the first prior knowledge comprises:
central coordinates of the blackboard-writing area are located in an upper half of the input image; and
the aspect ratio of the blackboard-writing area is within a first range.

15. The image processing method according to claim 1, wherein performing coordinate transformation on the target area according to the four vertices of the target area to obtain the corrected blackboard-writing area image comprises:
performing the coordinate transformation based on constraint conditions, wherein the constraint conditions comprise: the corrected blackboard-writing area image being a rectangle, and the four vertices of the target area corresponding to the four vertices of the rectangle after the coordinate transformation.

16. The image processing method according to claim 1, wherein determining the final predicted coordinates of the any two adjacent vertices based on the first angle value and the second angle comprises:
taking the current predicted coordinates of the any two adjacent vertices as the final predicted coordinates of the any two adjacent vertices in response to a difference between the first angle value and the second angle value being not greater than a first threshold.

17. The image processing method according to claim 16, wherein determining the final predicted coordinates of the any two adjacent vertices based on the first angle value and the second angle further comprises:
judging whether a minimum distance between the current predicted coordinates of the any two adjacent vertices and the curve segment is not greater than a second threshold in response to the difference between the first angle value and the second angle value being greater than the first threshold;

determining a first straight line passing through the current predicted coordinates of one of the any two adjacent vertices based on the slope of the average tangent in response to determining that a minimum distance between the current predicted coordinates of one of the any two adjacent vertices and the curve segment is not greater than the second threshold and a minimum distance between the current predicted coordinates of the other of the any two adjacent vertices and the curve segment is greater than the second threshold, at the same time, determining a second straight line based on the current predicted coordinates of the vertex opposite one of the any two adjacent vertices and the current predicted coordinates of the other of the any two adjacent vertices, taking the current predicted coordinates of one of the any two adjacent vertices as the final predicted coordinates of the one of the any two adjacent vertices, and taking coordinates of an intersection point of the first straight line and the second straight line as the final predicted coordinates of the other of the any two adjacent vertices; and in response to determining that a minimum distance between the current predicted coordinates of the any two adjacent vertices and the curve segment is greater than the second threshold, discarding the predicted subclasses currently including most predicted vertices and corresponding to each of the any two adjacent vertices, and taking the central coordinates of remaining predicted subclasses including most predicted vertices and corresponding to each of the any two adjacent vertices as the current predicted coordinates of each vertex in the any two adjacent vertices until the final predicted coordinates of each vertex in the any two adjacent vertices are determined.

18. The image processing method according to claim 17, wherein determining the final predicted coordinates of the any two adjacent vertices based on the first angle value and the second angle further comprises:

in response to determining that entire predicted subclasses corresponding to any two adjacent vertices are discarded, determining the average tangent of the curve segment corresponding to the any two adjacent vertices based on the slope of the average tangent of the curve segment corresponding to the any two adjacent vertices, determining a third straight line based on the current predicted coordinates of the vertex opposite one of the any two adjacent vertices and the current predicted coordinates of the other of the any two adjacent vertices, determining a fourth straight line based on the current predicted coordinates of the vertex opposite to the other of the any two adjacent vertices and the current predicted coordinates of one of the any two adjacent vertices, taking the coordinates of an intersection point of the average tangent and the third straight line as the final predicted coordinates of one of the any two adjacent vertices, and taking the coordinates of the intersection point of the average tangent and the third straight line as the final predicted coordinates of the other of the any two adjacent vertices.

19. An image processing apparatus for correcting blackboard-writing area image, comprising:
a memory for non-transitory storage of computer-readable instructions, and
a processor for executing the computer-readable instructions, wherein the processor, when executing the computer-readable instructions, is configured to:
acquire an input image of a teaching scenario;
perform detection on the input image to determine a rectangular detection area that comprises a blackboard-writing area;
analyze the rectangular detection area to determine a target area corresponding to the blackboard-writing area;
determine four vertices of the target area; and
perform coordinate transformation on the target area to obtain a corrected blackboard-writing area image according to the four vertices of the target area;
wherein the processor is further configured to:
perform contour detection processing on the target area using a contour detection algorithm to obtain at least one contour;
select the at least one contour to obtain at least one candidate contour;
determine a candidate corner point set based on the at least one candidate contour; and
determine the four vertices of the target area based on the candidate corner point set;
wherein the processor is further configured to:
obtain a video sequence of the teaching scenario;
extract a plurality of frames of images from the video sequence as the input images to obtain the four vertices of the target area on each frame of image of the plurality of frames of images;
take the four vertices of the target area on each frame of image of the plurality of frames of images as predicted vertices, and determine four final predicted vertices of the target area based on the predicted vertices; and
perform coordinate transformation on the target area in each frame of image of the video sequence to obtain a corrected blackboard-writing area image corresponding to each frame of image of the video sequence based on the four final predicted vertices of the target area;
wherein the processor is further configured to:
according to coordinates of the predicted vertices corresponding to each vertex of the target area, perform second clustering operation on the predicted vertices corresponding to each vertex to obtain at least one predicted subclass corresponding to each vertex, and take central coordinates of predicted subclass currently including most predicted vertices and corresponding to each vertex as current predicted coordinates for each vertex;
determine a first angle value between a connecting line of current predicted coordinates of any two adjacent vertices and a horizontal line based on the current predicted coordinates of the four vertices of the target area;
determine a predicted rectangular area on a certain frame of image of the plurality of frames of images based on the current predicted coordinates of the any two adjacent vertices, wherein the certain frame of image is subjected to filtering, saliency region detection, edge detection and binarization processing, the connecting line of the current predicted coordinates of the any two adjacent vertices is a diagonal of the predicted rectangular area, and each edge of the predicted rectangular area is parallel or perpendicular to the horizontal line;
find a straight line in the predicted rectangular area to determine a curve segment, wherein the curve segment comprises a plurality of line segments, determine a slope of an average tangent of the curve segment based on the plurality of line segments, and determine a second angle value between the average tangent and the horizontal line based on the slope of the average tangent; and determine final predicted coordinates of the any two adjacent vertices based on the first angle value and the second angle value.

20. A non-transitory storage medium that non-transitorily stores computer-readable instructions for correcting blackboard-writing area image, wherein a computer, when executing the computer-readable instructions, is configured to:

acquire an input image of a teaching scenario;

perform detection on the input image to determine a rectangular detection area that comprises a blackboard-writing area;

analyze the rectangular detection area to determine a target area corresponding to the blackboard-writing area;

determine four vertices of the target area; and perform coordinate transformation on the target area to obtain a corrected blackboard-writing area image according to the four vertices of the target area;

wherein the computer is further configured to:

perform contour detection processing on the target area using a contour detection algorithm to obtain at least one contour;

select the at least one contour to obtain at least one candidate contour;

determine a candidate corner point set based on the at least one candidate contour; and determine the four vertices of the target area based on the candidate corner point set;

wherein the computer is further configured to:

obtain a video sequence of the teaching scenario;

extract a plurality of frames of images from the video sequence as the input images to obtain the four vertices of the target area on each frame of image of the plurality of frames of images;

take the four vertices of the target area on each frame of image of the plurality of frames of images as predicted vertices, and determine four final predicted vertices of the target area based on the predicted vertices; and perform coordinate transformation on the target area in each frame of image of the video sequence to obtain a corrected blackboard-writing area image corresponding to each frame of image of the video sequence based on the four final predicted vertices of the target area;

wherein the computer is further configured to:

according to coordinates of the predicted vertices corresponding to each vertex of the target area, perform second clustering operation on the predicted vertices corresponding to each vertex to obtain at least one predicted subclass corresponding to each vertex, and take central coordinates of predicted subclass currently including most predicted vertices and corresponding to each vertex as current predicted coordinates for each vertex;

determine a first angle value between a connecting line of current predicted coordinates of any two adjacent vertices and a horizontal line based on the current predicted coordinates of the four vertices of the target area;

determine a predicted rectangular area on a certain frame of image of the plurality of frames of images based on the current predicted coordinates of the any two adjacent vertices, wherein the certain frame of image is subjected to filtering, saliency region detection, edge detection and binarization processing, the connecting line of the current predicted coordinates of the any two adjacent vertices is a diagonal of the predicted rectangular area, and each edge of the predicted rectangular area is parallel or perpendicular to the horizontal line;

find a straight line in the predicted rectangular area to determine a curve segment, wherein the curve segment comprises a plurality of line segments, determine a slope of an average tangent of the curve segment based on the plurality of line segments, and determine a second angle value between the average tangent and the horizontal line based on the slope of the average tangent; and determine final predicted coordinates of the any two adjacent vertices based on the first angle value and the second angle value.

* * * * *